United States Patent
Zhang et al.

(10) Patent No.: US 12,555,796 B2
(45) Date of Patent: Feb. 17, 2026

(54) PASSIVATED LITHIUM NITRIDE AS CATHODE PRE-LITHIATION REAGENT

(71) Applicant: A123 Systems LLC, Novi, MI (US)

(72) Inventors: Linghong Zhang, Waltham, MA (US); Derrick Maxwell, Maynard, MA (US); Shaocheng Hu, Waltham, MA (US); Claire Whitaker, Pittsfield, MA (US); Wilbur Zuo, Waltham, MA (US); Jun Wang, Shrewsbury, MA (US); Taehwan Yu, Burlington, MA (US)

(73) Assignee: A123 SYSTEMS LLC, Novi, MI (US)

(*) Notice: Subject to any disclaimer, the term of this patent is extended or adjusted under 35 U.S.C. 154(b) by 871 days.

(21) Appl. No.: 17/648,797

(22) Filed: Jan. 24, 2022

(65) Prior Publication Data
US 2022/0246940 A1 Aug. 4, 2022

Related U.S. Application Data

(60) Provisional application No. 63/145,390, filed on Feb. 3, 2021.

(51) Int. Cl.
*H01M 4/62* (2006.01)
*H01M 4/02* (2006.01)
(Continued)

(52) U.S. Cl.
CPC ........... *H01M 4/628* (2013.01); *H01M 4/366* (2013.01); *H01M 4/58* (2013.01); *H01M 10/0525* (2013.01); *H01M 2004/027* (2013.01)

(58) Field of Classification Search
CPC .. H01M 10/0525; H01M 10/058; H01M 4/36; H01M 4/366; H01M 4/58; H01M 4/628; H01M 2004/027; H01M 2004/028
See application file for complete search history.

(56) References Cited

U.S. PATENT DOCUMENTS 9,469,545 B2 10/2016 Kalla et al.
10,147,942 B2 12/2018 Son et al.
(Continued)

FOREIGN PATENT DOCUMENTS

| CN | 109346665 A | 2/2019 |
| CN | 111224077 A | 6/2020 |
| WO | 2020132622 A1 | 6/2020 |

OTHER PUBLICATIONS

Yongming Sun, Yanbin Li, Jie Sun, Yuzhang Li, Allen Pei, Yi Cui "Stabilized Li3N for efficient battery cathode prelithiation", Energy Storage Materials, (2017), 6, 119-124—This is the Elsevier Publication. (Year: 2017).*

(Continued)

*Primary Examiner* — Haroon S. Sheikh
(74) *Attorney, Agent, or Firm* — McCoy Russell LLP

(57) ABSTRACT

Systems and methods are provided for passivating lithium nitride ($Li_3N$) for use in a lithium-ion battery as a cathode pre-lithiation reagent. In one example, the cathode pre-lithiation reagent may include a core particle composed of $Li_3N$, and a passivation coating uniformly disposed on at least a portion of a surface of the core particle. In some examples, the passivation coating may cover a majority of the surface of the core particle or may substantially completely cover the surface of the core particle. The cathode pre-lithiation reagent may further be included in the lithium-ion battery, where the passivation coating may mitigate unwanted side reactions during processing and manufacturing. In this way, $Li_3N$ may be successfully and reproducibly utilized as a cathode pre-lithiation reagent, such that initial lithium ion consumption may be compensated and capacity of the lithium-ion battery may be concomitantly increased.

13 Claims, 11 Drawing Sheets

(51) Int. Cl.
  *H01M 4/36*  (2006.01)
  *H01M 4/58*  (2010.01)
  *H01M 10/0525*  (2010.01)

(56) References Cited

U.S. PATENT DOCUMENTS

| | | | |
|---|---|---|---|
| 10,374,228 | B2 | 8/2019 | Yakovleva et al. |
| 2006/0121352 | A1 | 6/2006 | Kejha et al. |
| 2007/0224506 | A1 | 9/2007 | Ooyama et al. |
| 2010/0024597 | A1 | 2/2010 | Dover et al. |
| 2013/0143122 | A1 | 6/2013 | Huang |
| 2015/0111099 | A1 | 4/2015 | Zhang |
| 2016/0351904 | A1 | 12/2016 | Goodenough et al. |
| 2016/0372784 | A1 | 12/2016 | Hayner et al. |
| 2017/0268110 | A1 | 9/2017 | Wietelmann |
| 2017/0301920 | A1* | 10/2017 | Liu ................ C08J 5/2231 |
| 2017/0309914 | A1 | 10/2017 | Drews et al. |
| 2018/0261829 | A1 | 9/2018 | Yakovleva et al. |
| 2019/0020033 | A1* | 1/2019 | Li ................ H01M 4/133 |
| 2023/0216044 | A1* | 7/2023 | Nakano ............ H01M 4/382 |
| | | | 429/231.95 |

OTHER PUBLICATIONS

Espacenet translation CN111224077A (Year: 2020).*
Imke Schröder, Christopher M. Kolodziej, Jose Antonio Moreno, and Craig A. Merlic "Lessons learned from Explosion and Fires Resulting from Quenching Lithium, Lithium Nitride, and Sodium" ACS Chemical Health & Safety 2024 31 (6), 473-481 (Year: 2024).*
Cardiano, P. et al., "A new application of ionic liquids: hydrophobic properties of tetraalkylammonium-based poly (ionic liquid)s," Journal of Materials Chemistry, vol. 18, No. 11, Feb. 8, 2008, 8 pages.
Tindale, J. et al., "Highly fluorinated phosphonium ionic liquids: novel media for the generation of superhydrophobic coatings," Chemical Communications, No. 14, Mar. 6, 2009, 3 pages.
Zhang, J., "Properties and Structures of Li-N Based Hydrogen Storage Materials," Doctor of Philosophy Dissertation in Materials Science and Engineering, Michigan Technological and Engineering, Department of Materials Science and Engineering, 2013, 145 pages.
Balach, J. et al., "Poly(ionic liquid)-derived nitrogen-doped hollow carbon spheres: synthesis and loading with Fe2O3 for high-performance lithium ion batteries," vol. 3, No. 21, Mar. 19, 2013, 8 pages.
Xin, B. et al., "Imidazolium-based ionic liquids grafted on solid surfaces," Chemical Society Reviews, vol. 43, No. 20, Jul. 7, 2014, 18 pages.
Park, K. et al., "Li3N as a Cathode Additive for High-Energy-Density Lithium-Ion Batteries," Advanced Energy Materials, vol. 6, No. 10, May 25, 2016, 7 pages.
Eftekhari, A. et al., "Different roles of ionic liquids in lithium batteries," Journal of Power Sources, vol. 334, Dec. 2016, 19 pages.
Sun, Y. et al., "Stabilized Li3N for efficient battery cathode prelithiation," Energy Storage Materials, vol. 6, Jan. 2017, 19 pages.
Eftekhari, A. et al., "Synthesis and properties of polymerized ionic liquids," European Polymer Journal, vol. 90, May 2017, 29 pages.
Ren, Y. et al., "Polypropylene Nonwoven Fabric@Poly(ionic liquid)s for Switchable Oil/Water Separation, Dye Absorption and Antibacterial Applications," Chemsuschem, vol. 11, No. 6, Jan. 2018, 8 pages.
Zhang, T. et al., "A lithium-ion oxygen battery with a Si anode lithiated in situ be a Li3N-containing cathode," Chemical Communications, vol. 54, No. 9, Jan. 1, 2018, 4 pages.
Bian, X. et al., "Dual Roles of Li3N as an Electrode Additive for Li-Excess Layered Cathode Materials: A Li-Ion Sacrificial Salt and Electrode-Stabilizing Agent," Chemistry: A European Journal, vol. 24, No. 52, Sep. 18, 2018, Available Online Jul. 5, 2018, 6 pages.
Sun, C. et al., "High-efficiency sacrificial prelithiation of lithium-ion capacitors with superior energy-storage performance," Energy Storage Materials, vol. 24, Jan. 2020, 7 pages.
ISA Korean Intellectual Property Office, International Search Report and Written Opinion Issued in Application No. PCT/US2019/068133, Apr. 29, 2020, WIPO, 11 pages.

* cited by examiner

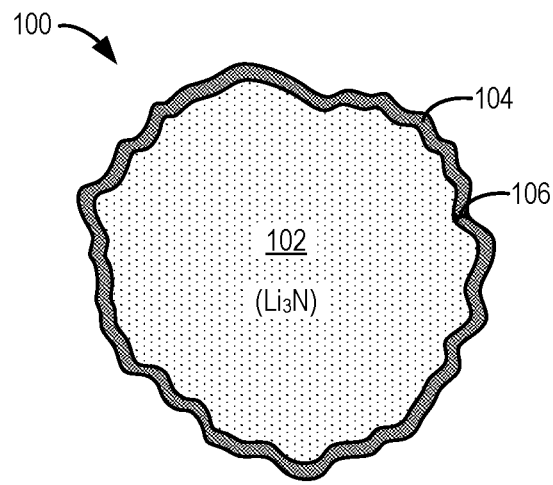
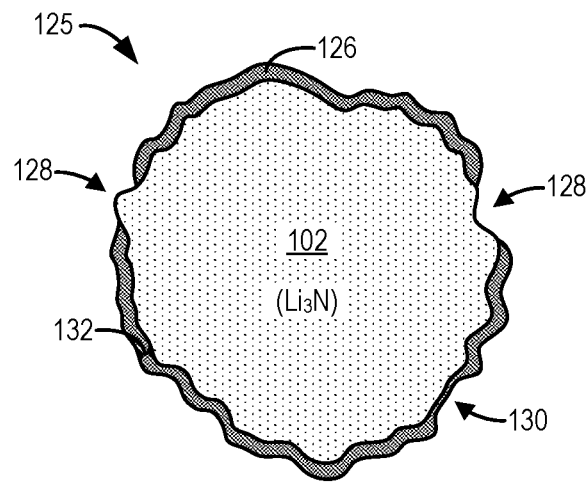
FIG. 1A
FIG. 1B
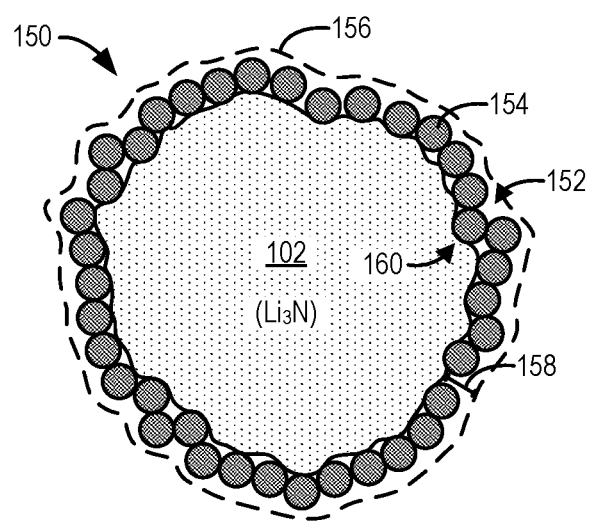
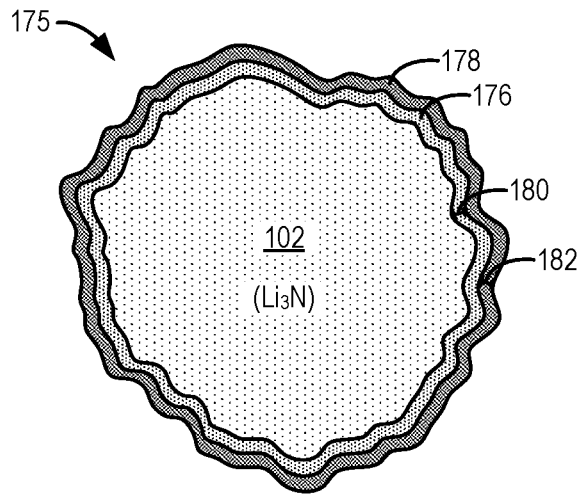
FIG. 1C
FIG. 1D

PASSIVATED LITHIUM NITRIDE AS CATHODE PRE-LITHIATION REAGENT

CROSS REFERENCE TO RELATED APPLICATIONS

The present application claims priority to U.S. Provisional Application No. 63/145,390, entitled "PASSIVATED LITHIUM NITRIDE AS CATHODE PRE-LITHIATION REAGENT," and filed on Feb. 3, 2021. The entire contents of the above-identified application are hereby incorporated by reference for all purposes.

FIELD

The present description relates generally to systems and methods for passivating lithium nitride ($Li_3N$), particularly for use as a cathode pre-lithiation reagent.

BACKGROUND AND SUMMARY

Lithium-ion batteries are widely used in a broad range of applications, including consumer electronics, uninterruptible power supplies, transportation, stationary applications, etc. A lithium-ion battery functions by passing $Li^+$ ions from a positive electrode, or cathode, including positive electrode active materials (for example, lithium insertion/deinsertion materials) to a lithium-based negative electrode, or anode, during battery charging and then passing $Li^+$ ions back to the cathode from the anode during battery discharging. A consequence of the charge/discharge process is the formation of a solid-electrolyte interphase (SEI) layer on the anode during the first charge cycle. The SEI layer may prove detrimental to electrochemical performance as the formation process results in significant $Li^+$ consumption, particularly in silicon-based anodes. As such, SEI formation may lower the first-cycle Coulombic efficiency (FCE), resulting in lower capacity and lower initial energy density of the lithium-ion battery.

To counter low FCE and resultant capacity and initial energy density loss due to anodic SEI formation, a pre-lithiation approach may be employed to provide the anode with extra $Li^+$ ions prior to, or during, first charge/discharge. Pre-lithiation may be accomplished in a number of ways, such as chemical treatment of the anode or incorporation of a sacrificial pre-lithiation reagent at the cathode. To expand on the latter case, one or more sacrificial lithium sources may be added to the cathode such that an increased amount of $Li^+$ ions may flow to the anode during initial charging of the lithium-ion battery.

For example, lithium nitride ($Li_3N$) may be included at the cathode as a sacrificial pre-lithiation reagent to improve an energy density of the lithium-ion battery. Due to a number of distinct processing and electrochemical advantages, $Li_3N$ may be desirable as the sacrificial pre-lithiation reagent over other options. As a first example, $Li_3N$ has a particularly high theoretical capacity relative to other common sacrificial pre-lithiation reagents. Specifically, the following reaction corresponds to a theoretical capacity of 2309 mAh $g^{-1}$:

$$2Li_3N \rightarrow 6Li^+ + 3N_2 \pm 6e^- \quad (1)$$

Accordingly, less $Li_3N$ may be utilized relative to other common sacrificial pre-lithiation reagents to obtain an equivalent release of $Li^+$ ions during initial battery charging, thereby minimizing potential complications ascribed to inclusion of the sacrificial pre-lithiation reagent in electrode slurries used in forming a given electrode (discussed in more detail below).

As a second example, use of cathode catalysts may be precluded for $Li_3N$ decomposition at practical cathode potentials. In the case of other common sacrificial pre-lithiation reagents, reaction kinetics and surface impurity layers may result in large overpotentials for catalyst-free decomposition (rendering use of such options impractical without inclusion of cathode catalysts). $Li_3N$, on the other hand, has a low theoretical decomposition potential of ~0.0.44 V vs. Li/$Li^+$, potentially allowing decomposition to proceed during battery charging without a cathode catalyst.

As a third example, $Li_3N$ decomposition produces an inert nitrogen gas ($N_2$) byproduct (see reaction (1)), which may be readily removed during formation of the lithium ion battery. In contrast, some compounds may generate an oxygen gas ($O_2$) byproduct, which may participate in parasitic reactions with electrode active materials and/or electrolyte species. Such $O_2$-generating compounds may therefore be undesirable as primary sacrificial pre-lithiation reagents due to electrochemical and safety disadvantages.

Despite having such promising properties, pristine (untreated) $Li_3N$ may be impractical for commercialization due to a high reactivity thereof in moisture, air, and common electrode slurry solvents and components, such as N-2-methyl-pyrrolidone (NMP) and polyvinylidene fluoride (PVDF). Incompatibility with air and PVDF in particular may be at least partially ascribed to trace amounts of moisture therein. For instance, $Li_3N$ may readily react with water to create a basic environment in the lithium-ion battery. In examples where PVDF is present, the basic environment may induce dehydrofluorination of PVDF, resulting in unfavorable binder cross-linking and gelation (and therefore substantially unprocessable electrode slurries).

To ameliorate reactivity issues, a passivation coating may therefore be applied to pristine $Li_3N$ particles to protect and stabilize $Li_3N$ for use in lithium-ion battery environments. However, the inventors herein consider passivation of $Li_3N$ non-trivial for numerous reasons. As an example, design of passivation coating processes may be carefully calibrated so as not to hinder decomposition of $Li_3N$ prior to inclusion in the lithium-ion battery, thereby permitting maximal pre-lithiation during battery charging. Specifically, uncontrolled environmental conditions may complicate reproducible passivation. For instance, the passivation coating may be desirably thin and uniform. Yet some passivation coating processes, such as surface conversion of $Li_3N$ particles in moisture- or oxygen-ridden atmospheric conditions, may generate gases hindering formation of controllably thin and uniform passivation coatings (additionally, high temperatures may accelerate such surface conversion, resulting in undesirably excessive $Li_3N$ conversion).

The inventors herein have identified the above problems and have determined solutions to at least partially solve them. In one example, $Li_3N$ particles may be passivated via precision control of chemical/physical interactions with one or more passivation precursors, such that a reproducibly thin and uniform passivation coating may be disposed on surfaces of the $Li_3N$ particles. In some examples, the passivation coating may substantially completely cover the $Li_3N$ particles such that minimal $Li_3N$ may be exposed to a surrounding processing environment. In this way, the $Li_3N$ particles may be protected during battery manufacturing so as to provide maximal pre-lithiation of a lithium-ion battery including the passivated $Li_3N$ particles, thereby improving an overall electrochemical performance of the lithium-ion battery. Further, because the $Li_3N$ particles may be protected from reactions with other compounds present during electrode slurry formation (NMP, PVDF, etc.), increased processing flexibility may be achieved.

In some examples, the passivation coating may serve additional functions in the lithium-ion battery. For instance, the passivation coating may include a secondary sacrificial pre-lithiation reagent, such as $Li_2O$ or $Li_2CO_3$, which may also decompose during initial battery charging. As such, a cathode catalyst may optionally be provided to facilitate decomposition of the secondary sacrificial pre-lithiation reagent (however, and as discussed above, the $Li_3N$ particles functioning as a primary sacrificial pre-lithiation reagent may decompose sans catalytic action). As another example, a carbonaceous coating may enhance electronic conductivity during operation of the lithium-ion battery. As yet another example, certain passivation coating compositions, such as those based on polymerization ionic liquids (PILs) or ionomers, may enhance ionic conductivity by facilitating $Li^+$ transport in the lithium-ion battery. When included, the PILs and ionomers may further be selected for hydrophobicity, further protecting $Li_3N$ from unwanted reaction with moisture. As still another example, metals or metal oxides may be included in the passivation coating to stabilize a positive electrode active material of the cathode and improve cycling performance of the lithium-ion battery.

In additional or alternative examples, the passivation coating may readily decompose during battery charging, allowing for more rapid $Li_3N$ degradation and thereby quicker $Li^+$ ion release. Facile passivation coating decomposition may be provided by the decomposition of the secondary sacrificial pre-lithiation reagents discussed above, for example. In cases where the $Li_3N$ particles are coated in miscible organic materials, the passivation coating may dissolve upon immersion in an electrolytic environment. In this way, the passivation precursor may be selected to both protect the $Li_3N$ particles during processing and further enhance the overall battery performance by providing additional electrochemical advantages and/or facilitating $Li_3N$ decomposition to increase a rate of pre-lithiation during initial cycling of the lithium-ion battery.

In one example, a cathode pre-lithiation reagent may include a core particle including $Li_3N$, and a passivation coating uniformly disposed on at least a portion of a surface of the core particle. In this way, following processing and manufacturing of a lithium-ion battery, uniformly passivated $Li_3N$ core particles included therein may decompose to provide maximal pre-lithiation and concomitant capacity increase during initial cycling of the lithium-ion battery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1A-1D show schematic diagrams of exemplary passivated lithium nitride ($Li_3N$) particles.

DETAILED DESCRIPTION

Figure 12:
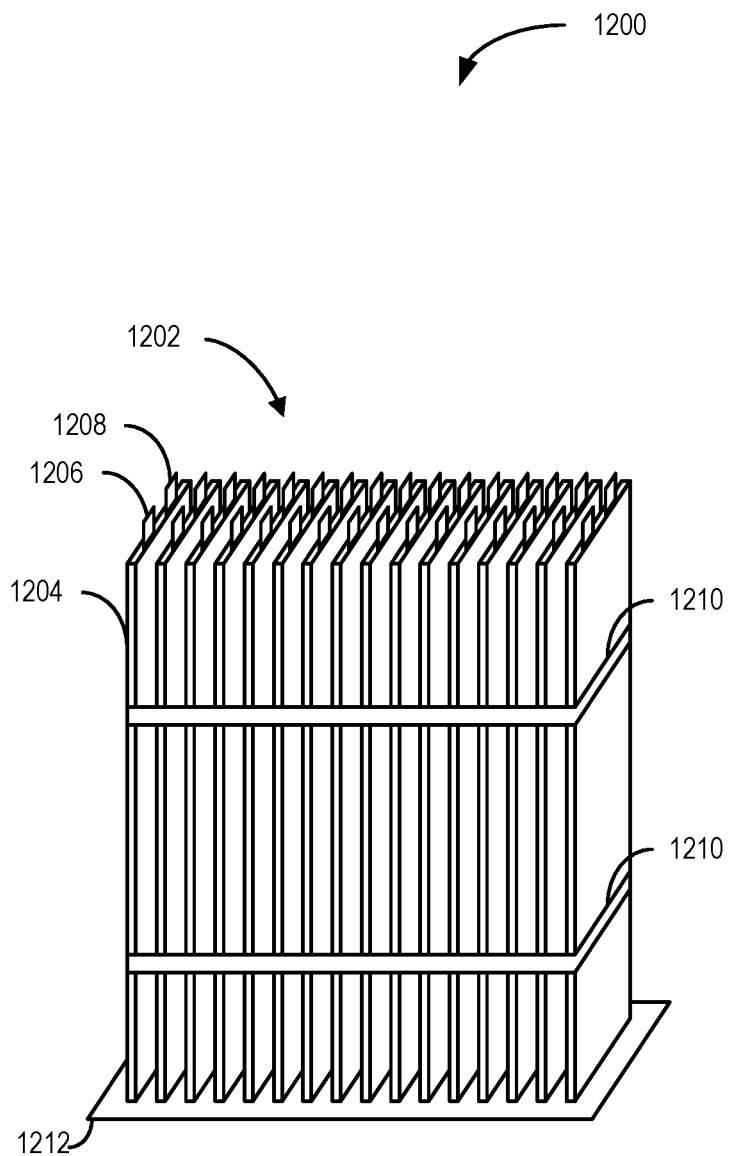
FIG. 12 shows an example of a lithium ion battery pack, formed of a plurality of lithium ion battery cells in which the coated cathode structures of FIGS. 3A-3B may be implemented.

The following description relates to systems and methods for passivating lithium nitride ($Li_3N$) for use as a cathode pre-lithiation reagent, for example, in a lithium-ion battery, an example of which is depicted in FIG. 12. Specifically, and as described herein with reference to FIGS. 1A-1D, $Li_3N$ may be provided in the form of a powder, particulates, or particles with a uniform passivation coating disposed thereon. The uniform passivation coating may cover at least a portion of (e.g., as much as a majority of or even substantially all) surfaces of the $Li_3N$ particles. In this way, unwanted side reactions may be mitigated during processing and manufacturing of the lithium-ion battery including the passivation-coated $Li_3N$ particles, such that degradation of $Li_3N$ may be prevented before initial charge/discharge cycling of the lithium-ion battery.

As used herein, "uniform" when referring to a coating on a given surface of a particle or other structure may be used to describe substantially similar density of the coating in or on any threshold portion of the given surface (for example, a total surface area or less than the total surface area). Further, "substantially" may be used herein as a qualifier meaning "effectively" or "practically." Accordingly, as used herein, "substantially complete" or "substantially all" when referring to surface coverage may refer to total and complete surface coverage for practical considerations. For example, a given $Li_3N$ particle may be considered substantially completely covered by the uniform passivation coating even though relatively small gaps may remain in the uniform passivation coating if such relatively small gaps negligibly degrade electrochemical performance.

Figure 2:
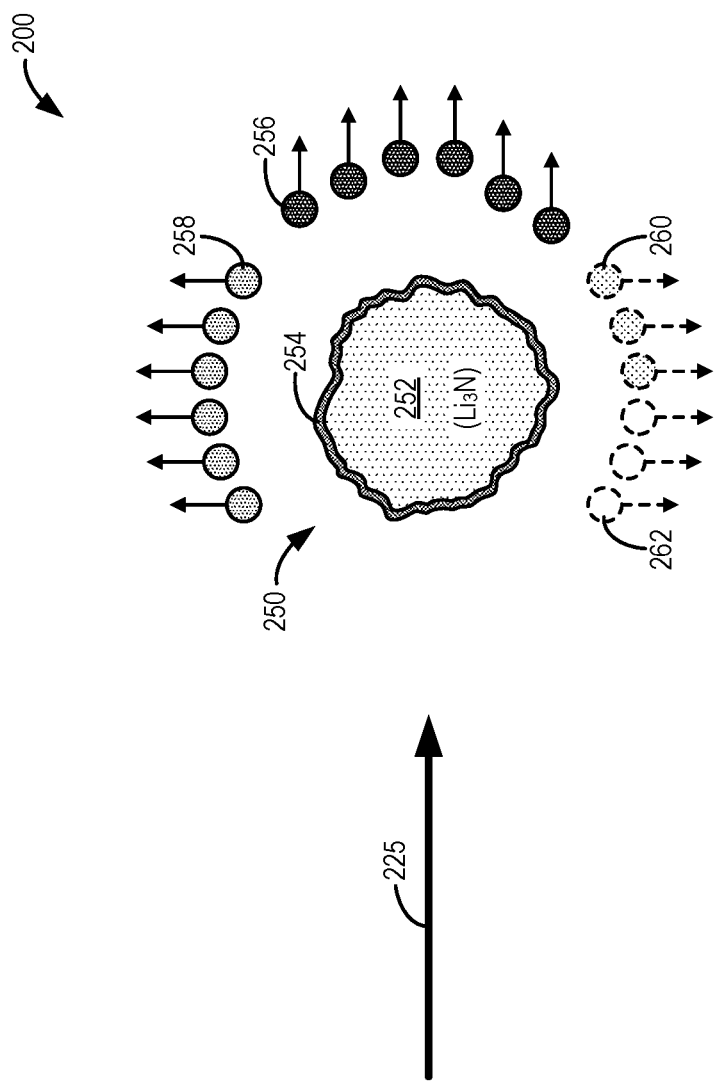
FIG. 2 shows a schematic diagram of a decomposition process of an exemplary passivated $Li_3N$ particle.
Figure 2:
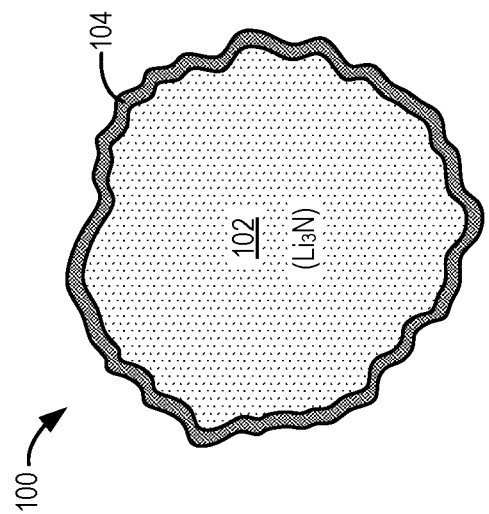

As shown in FIG. 2, during initial charge/discharge of the lithium-ion battery, the $Li_3N$ particles may decompose into $Li^+$ ions and nitrogen gas ($N_2$). $N_2$, being inert, may easily be removed from the lithium-ion battery via degassing (for example, via compressive rolling of a pouch cell). In some examples, the uniform passivation coating may decompose into additional $Li^+$ ions and further gases and/or inert residues. In other examples, the uniform passivation coating may dissolve into an electrolyte of the lithium-ion battery, having little or no effect on electrochemical performance following dissolution. In other examples, the uniform passivation coating may be retained at a cathode of the lithium-ion battery, whereat the uniform passivation coating may provide secondary electrochemical benefits.

Figure 3A:
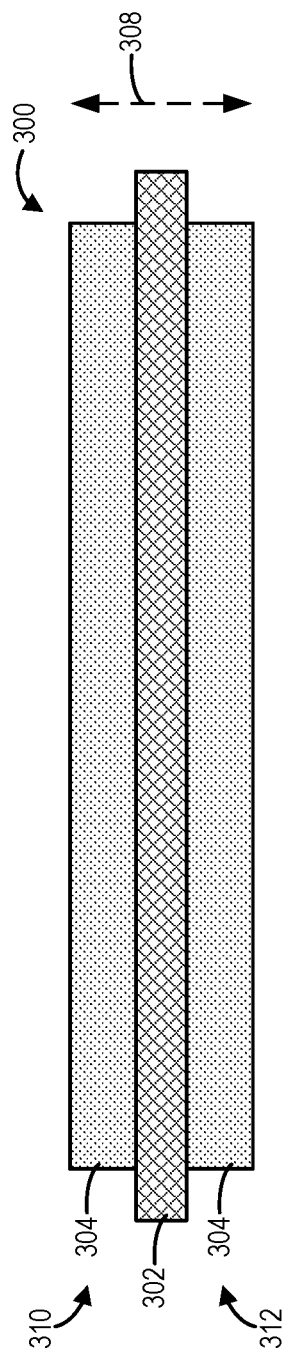
FIGS. 3A and 3B show schematic diagrams of exemplary coated cathode structures.
Figure 3B:
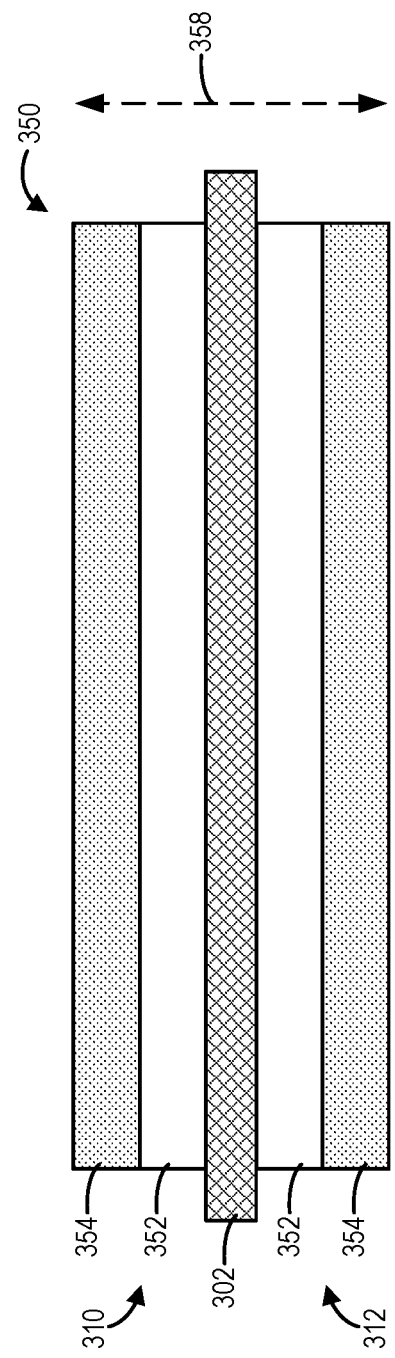

In some examples, the cathode pre-lithiation reagent (for example, the $Li_3N$ particles with the uniform passivation coating disposed thereon) may be incorporated into a cathode slurry along with cathode active material particles. The cathode slurry may be cast, dried, and calendered on a cathode structure (a current collector, for example, optionally having a coating layer disposed thereon) such that a layered cathode configuration may be formed. In other examples, the cathode active material and the cathode pre-lithiation reagent may be included in the cathode in separate slurry-based layers. Exemplary layered cathode configurations are depicted in FIGS. 3A and 3B.

Figure 4A:
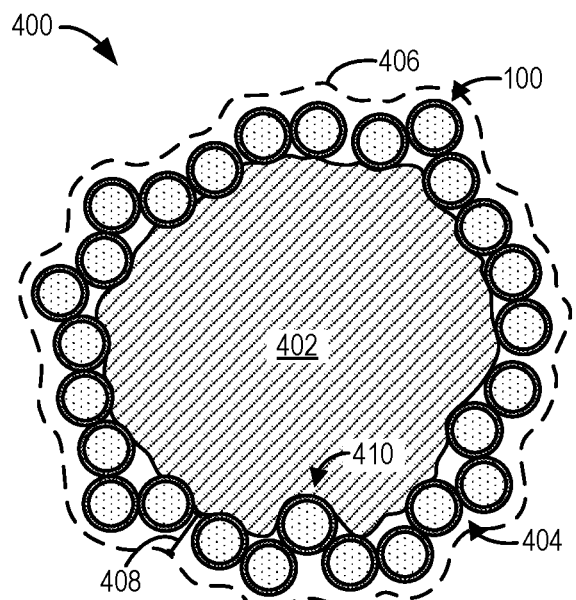
FIGS. 4A-4C show schematic diagrams of exemplary positive electrode active material particles coated with passivated $Li_3N$ particles.
Figure 4B:
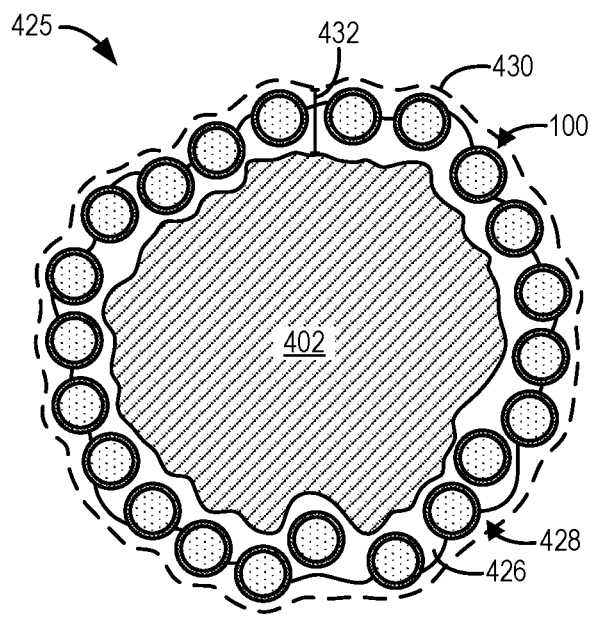
Figure 4C:
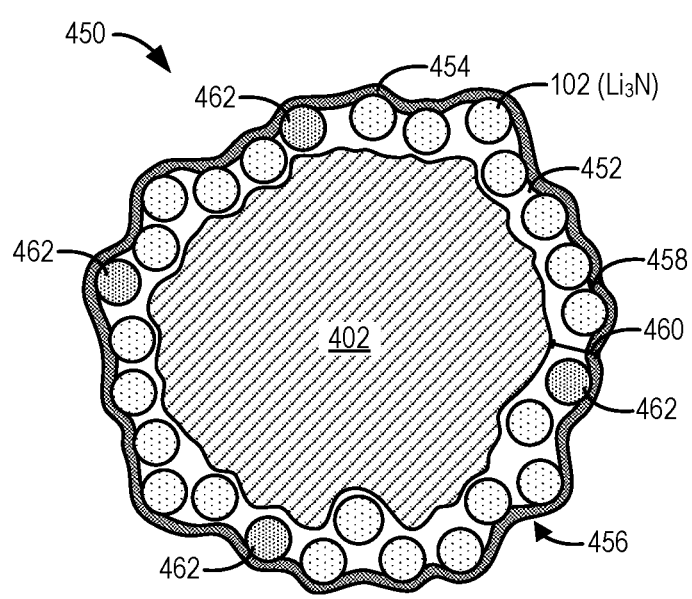

In some examples, and as shown in FIGS. 4A and 4B, the cathode active material particles may be coated with uniformly passivated $Li_3N$ particles, in addition to or including carbonaceous conductive and/or binder additives in some examples. In other examples, and as shown in FIG. 4C, the cathode active material particles may be coated with pristine (non-passivated) $Li_3N$ particles. The $Li_3N$-coated cathode active material particles may then be coated with the uniform passivation coating. In this way, uniform distribution of the cathode pre-lithiation reagent (e.g., the $Li_3N$ particles) in the cathode active material particle coating may be facilitated, thereby minimizing an impact of addition and decomposition of the cathode pre-lithiation reagent on mechanical and electrochemical integrity of the cathode active material particle coating.

Figure 5:
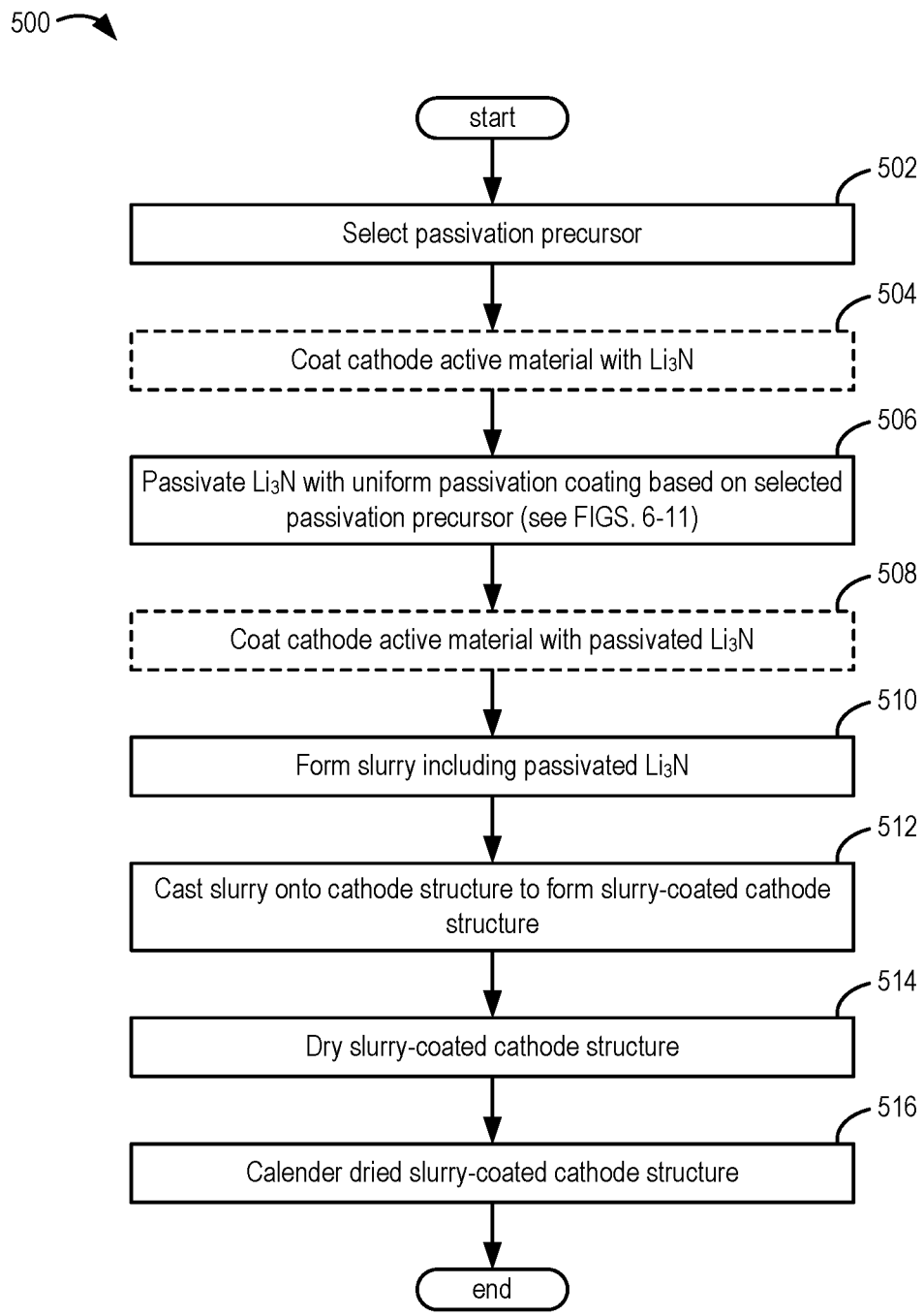
FIG. 5 shows a flow chart of a method for forming a cathode including passivated $Li_3N$ particles.

The method depicted in FIG. 5 details preparation of the uniform passivation coating on the $Li_3N$ particles or the $Li_3N$-coated cathode active material particles, followed by formation of a cathode including such uniformly-passivated particles. Passivation may be realized via a specific passivation coating process, such as one of the exemplary methods of FIGS. 6-11, steps of which may be selected and tuned depending on a desired passivation coating composition.

Referring now to FIG. 1A, a schematic cross-section illustrating a pre-lithiation reagent particle 100, such as for a cathode of a lithium-ion battery, is shown. The pre-lithiation reagent particle 100 may be passivated, including a core particle 102 surrounded by a passivation coating 104. As shown, the core particle 102 may be substantially entirely composed of $Li_3N$. For example, the pre-lithiation reagent particle 100 may be prepared by passivating a pure, chemical grade $Li_3N$ particle, such that the core particle 102 may be composed of $Li_3N$ and trace impurities or substantially no impurities.

Pre-lithiation reagents, such as the pre-lithiation reagent particle 100, may improve an energy density of a lithium-ion battery by at least partially decomposing during initial charge/discharge cycling of the lithium-ion battery to provide (sacrifice) additional $Li^+$ ions. Though possessing desirable advantages in this regard (low theoretical decomposition potential, high theoretical capacity, etc.), $Li_3N$ may be impractical for mass-scale implementation due to a high reactivity thereof.

To improve stability and practicality of $Li_3N$ as a pre-lithiation reagent, a passivation coating, such as the passivation coating 104, may be disposed on surfaces of a $Li_3N$ core particle, such as the core particle 102, as a blocking interface to improve $Li_3N$ stability and decrease a rate of $Li_3N$ degradation prior to charge/discharge cycling. In addition to protection and passivation of the $Li_3N$ core particle, the passivation coating may also serve other functions in the lithium-ion battery, such as improving one or more of electronic conductivity, ionic conductivity, cycling performance, and electrode active material stability, and/or providing further $Li^+$ ions.

As an example, the passivation coating 104 may include one or more of lithium peroxide ($Li_2O_2$), lithium oxide or lithia ($Li_2O$), lithium carbonate ($Li_2CO_3$), lithium sulfide ($Li_2S$), and lithium fluoride (LiF). When included in the passivation coating 104, $Li_2O_2$, $Li_2O$, $Li_2CO_3$, $Li_2S$, and/or LiF may function as a secondary pre-lithiation reagent (with $Li_3N$ being a primary pre-lithiation reagent), providing additional $Li^+$ ions during a first charge cycle of a lithium-ion battery including the pre-lithiation reagent particle 100.

In some examples, such as when the secondary pre-lithiation reagent ($Li_2O_2$, $Li_2O$, $Li_2CO_3$, $Li_2S$, and/or LiF) is included in the passivation coating 104, a cathode catalyst may further be included in the passivation coating 104. The cathode catalyst may include any material which catalyzes decomposition of the secondary pre-lithiation reagent during pre-lithiation of the lithium-ion battery. However, it will be appreciated that the primary pre-lithiation reagent $Li_3N$ may decompose without catalyzing action by a cathode catalyst, due to a low theoretical decomposition potential thereof. Thus, in some examples (such as when no secondary pre-lithiation reagent is included in the passivation coating 104), no cathode catalyst may be present or added, e.g., prior to initial cycling. In other examples (such as when the passivation coating 104 has a relatively low thickness 106), the secondary pre-lithiation reagent may be included in the passivation coating 104 and may decompose absent the cathode catalyst.

The cathode catalyst may include a material which may not be consumed during the first charge cycle and which may not fully decompose during a lifetime of the lithium-ion battery (such that at least some residual cathode catalyst may remain in the lithium-ion battery). In some examples, the cathode catalyst may include a lithium-based active cathode catalyst, where the lithium-based active cathode catalyst may be any lithium compound which reversibly releases and accepts lithium ions during a charge cycle and catalyzes the decomposition of the secondary pre-lithiation reagent. For example, the cathode catalyst may include one or more lithium metal phosphates, such as lithium iron phosphate (LFP) and/or lithium manganese iron phosphate (LMFP). In some examples, the cathode catalyst may include a transition-metal based compound with partially populated d and/or f orbitals, which may instigate electronic transitions and lower an activation energy for the decomposition of the secondary pre-lithiation reagent. For example, the cathode catalyst may be a transition metal oxide, such as cobalt tetraoxide ($CO_3O_4$).

As another example, the passivation coating 104 may include a carbonaceous conductive additive. For example, the passivation coating 104 may include one or more of carbon black, graphene, graphene oxide, and carbon nanotubes (CNTs). In addition to passivation and protection, the carbonaceous conductive additive may also increase an electronic conductivity and reduce a total amount of carbon utilized in preparation of electrode slurries for forming electrodes of the lithium-ion battery.

As another example, the passivation coating 104 may include one or more organic materials, such as one or more waxes, one or more long-chain conductive polymers, and/or one or more small organic molecules. For instance, the one or more organic materials may include one or more of natural wax, paraffin wax, polyethylene (PE), polypropylene (PP), polystyrene (PS), oleic acid, stearic acid, poly(vinylidene fluoride-co-hexafluoropropylene) (PVDF-HFP), poly(ethylene) oxide (PEO), poly(methyl methacrylate) (PMMA), poly(methyl acrylate) (PMA), and the like. The one or more organic materials may be selected based on solubility in an electrolytic environment of the lithium-ion battery. Specifically, when the passivation coating 104 including the one or more organic materials is exposed to an electrolyte, each of the one or more organic materials may dissolve into the electrolyte such that the core particle 102 may then be exposed for faster and more efficient decomposition. For example, the one or more organic materials soluble in the electrolyte may include one or more of PEO, PMMA, PMA, and the like. Further, the one or more organic materials may be selected to be substantially electrochemically inert, such that electrochemical performance may not be practically hindered following dissolution of the one or more organic materials into the electrolyte.

As another example, the passivation coating 104 may include one or more polymeric salts, such as one or more polymerization ionic liquids (PILs) and/or ionomers. Options for PILs which may be included in the passivation coating 104 may include, for example, imadazolium ($C_3H_5N_2^+$) combined with hexafluorophosphate ($PF_6^-$) or tetrafluoroborate ($BF_4^-$). Further cations, such as one or more of ammonium ($NH_4^+$), phosphonium (e.g., $H_4P^+$), pyridinium ($HC_5H_5N^+$), and sulfonium (e.g., $H_3S^+$) cations, may be reacted with brominated alkyl chains to generate oligomeric cations which may undergo further polymerization reactions (provided that one of the moieties extending from a primary ionic molecular center of a given oligomeric cation includes a terminal alkene group). Further anionic pairings may include one or more of chloride ($Cl^-$), bromide ($Br^-$), iodide ($I^-$), nitrate ($NO_3^-$), methyl sulfate ($CH_3O_4S^-$), bis(trifluoromethanesulfonyl)imide ($C_2F_6NO_4S_2^-$), trifluoromethanesulfonate ($CF_3O_3S^-$), dicyanamide ($C_2N_3$), dimethyl phosphate ($C_2H_6O_{4P}^-$), acetate ($C_2H_3O_2$), tosylate ($H_3CC_6H_4SO_3^-$), alkylsulfates, etc., selection of which being dependent on a voltage range of stability of a resultant PIL.

PILs are a subclass of ionic liquids, which are anion/cation pairs present in a liquid state at room temperature and have relatively high ionic conductivity. Accordingly, ionic liquids may facilitate lithium transport in lithium-ion batteries, concomitantly improving electrochemical performance thereof. Further, ionic liquids may have relatively low toxicity, may solubilize other compounds, and may have high thermal and electrochemical stability.

Either an anion or cation of the anion/cation pair of a given PIL may be able to undergo a polymerization reaction via chemical, photochemical, or thermal initiation, resulting in growth of a polymer backbone in which each monomeric unit may retain an ionic charge along with an associated counter ion. Accordingly, PILs may be applied in liquid form to surfaces of $Li_3N$ particles (such as the core particles 102), whereat in situ polymerization may yield a robust and highly ionic conductive polymer matrix.

Virtually limitless combinations of anion and cation identities in selecting PIL composition may allow tuning of one or more of the following processing and electrochemical performance parameters:

Anodic and/or cathodic electrochemical stability.
Liquid state viscosity of the PIL and temperature response.
Compatibility of ionic species within the lithium-ion battery.
Selection of solvent-based or solvent-free application.
Formation of polymer matrices and complexed composites with other materials.
Selection of moieties to serve desired purposes and provide desired properties.
Hydrophobicity/hydrophilicity (via ion exchange).
pH management during electrode slurry formation.
Selection of polymerization before or after coating, either on a surface of a substrate (such as the surface of the core particle 102) or within a formed electrode as a binder.
Formation of porous or non-porous networks.

To prepare the PIL for slurry processing, moisture removal and purification may be conducted via batch hydrolysis or liquid-liquid extraction. A given PIL for inclusion in the passivation coating 104 may further be selected for high hydrophobicity (which may mitigate aqueous degradation of the core particle 102 by inducing resistance to moisture uptake) and facile application as a uniform, continuous coating. As used herein, "continuous" when referring to a layer or coating on a substrate (such as a particle) may describe complete or substantially complete coverage of a given coated surface area of the substrate with a continuous film. By also selecting the PIL to respond to changes in electrode slurry pH, electrode slurry gelation may be correspondingly reduced in some examples. Further still, controlling for high viscosity of the PIL may prevent moisture uptake even during slurry processing.

Ionomers are ionically charged salt forms of polymers which may possess at least some similar properties to PILs, such as good ionic conductivity (depending on a degree of protonation). For example, a solvent may be used for desolvation and solution processing to apply ionomers to a surface of a substrate (such as the surface of the core particle 102). One exemplary ionomer which may be included in the lithium-ion battery includes Nafion™. However, cost considerations may limit mass-scale implementation of currently available ionomers.

As another example, the passivation coating 104 may include one or more non-lithium metals or metal oxides. For example, the passivation coating 104 may include one or more of Al, Fe, Cu, W, V, Ti, Ni, Zn, Cd, Ag, Co, and oxides thereof. The non-lithium metal or metal oxide may stabilize an electrode active material in the electrode slurry (such as lithium nickel manganese cobalt oxide or NMC, as discussed in detail with reference to FIGS. 4A-4C) and improve cycling performance of the electrode formed from the electrode slurry.

The passivation coating 104 may not be limited to the above described compositions. Specifically, other options or classes of compounds may be included in the passivation coating 104, either independently, or in combination with the above described compositions.

A size of the pre-lithiation reagent particle 100 and the thickness 106 of the passivation coating 104 may be selected to provide improved electrochemical performance via maximal pre-lithiation, while maintaining protection of the core particle 102 during slurry processing. In some examples, a relationship between multiple pre-lithiation reagent particles 100 may be formed such that each pre-lithiation reagent particle 100 may have a similar size to one another. For example, a plurality of pre-lithiation reagent particles 100 for inclusion in an electrode slurry may be milled to generate a preselected particle size distribution (PSD) having a peak at or below 150 nm. In some examples, the PSD may be a normal or bimodal PSD.

In some examples, an average size (for example, a D50 size) of the plurality of pre-lithiation reagent particles 100 may be less than or equal to 150 nm. In additional or alternative examples, any given pre-lithiation reagent particle 100 may have a largest cross-sectional dimension of less than or equal to 500 nm.

In some examples, the thickness 106 of the passivation coating 104 may be controlled during passivation of the core particle 102 such that the passivation coating 104 may not be so thick as to significantly hamper a rate of pre-lithiation and not so thin as to inadequately passivate the core particle 102 during slurry processing. As such, the thickness 106 of the passivation coating 104 may be less than or equal to 20 nm, for example. In additional or alternative examples, the thickness 106 of the passivation coating 104 may be greater than or equal to 10 nm. In one example, the thickness 106 of the passivation coating 104 may range from 1 nm to 50 nm.

In one example, and as shown in FIG. 1A, the passivation coating 104 may uniformly, continuously, and completely cover the surface of the core particle 102. Specifically, the passivation coating 104 may be uniformly disposed on substantially 100% of the surface of the core particle 102, such that the passivation coating 104 may be formed as a continuous layer thereon. However, in other examples, the passivation coating 104 may be disposed on a portion (e.g., less than 100%) of the surface of the core particle 102.

One example of such a partial passivation coating is depicted in FIG. 1B. Referring now to FIG. 1B, a schematic cross-section illustrating a pre-lithiation reagent particle 125, such as for a cathode of a lithium-ion battery, is shown. As in the pre-lithiation reagent particle 100 of FIG. 1A, the pre-lithiation reagent particle 125 may include the core particle 102 with a passivation coating 126 disposed thereon, where the core particle 102 may be substantially entirely composed of $Li_3N$. Further compositional and structural aspects of the core particle 102 may be as described above with reference to FIG. 1A. Additionally, it will be appreciated that a composition of the passivation coating 126 may be similar or equivalent to the composition of the passivation coating 104, as described in detail above with reference to FIG. 1A.

As shown in FIG. 1B, the passivation coating 126 may include one or more gaps 128. The one or more gaps 128 may expose at least some of the surface of the core particle 102 to a surrounding environment. However, it will be appreciated that the passivation coating 126 may still cover a majority (at least 50%) of the surface of the core particle 102. It will further be appreciated that the one or more gaps 128 may not collectively expose enough of the surface of the core particle 102 such that significant degradation of the core particle 102, e.g., sufficient degradation to adversely affect an electrochemical performance thereof, occurs prior to inclusion in the lithium-ion battery.

As further shown in FIG. 1B, the passivation coating 126 may include one or more low coating regions 130 having a thickness less than a (maximum) thickness 132 of the passivation coating 126. In some examples, the thickness 132 of the passivation coating 126 may be less than or equal to 20 nm. In additional or alternative examples, the thickness 132 of the passivation coating 126 may be greater than or equal to 10 nm. In one example, the thickness 132 of the passivation coating 126 may range from 1 nm to 50 nm. As the thickness 132 of the passivation coating 126 may be controlled during passivation so as not to be so thin as to inadequately passivate the core particle 102 during slurry processing, it will be appreciated that the one or more low coating regions 130 may be limited to relatively small portions of the surface of the core particle 102, and that the passivation coating 126 may uniformly cover a majority (at least 50%) of the surface of the core particle 102 at the thickness 132. It will further be appreciated that the one or more low coating regions 130, having a relatively small coverage of the core particle, may not result in significantly greater degradation of the core particle 102 prior to inclusion in the lithium-ion battery.

Though continuous passivation coating coverage on the core particle 102 is depicted at FIGS. 1A and 1B, in other examples the passivation coating may be a discrete coating. As used herein, "discrete" when referring to a coating or layer of a substrate (such as a particle) may refer to complete or substantially complete coverage (e.g., greater than 50%) of a given coated surface area of the substrate with a discrete particulate layer.

One example of such a discrete passivation coating is depicted in FIG. 1C. Referring now to FIG. 1C, a schematic cross-section illustrating a pre-lithiation reagent particle 150, such as for a cathode of a lithium-ion battery, is shown. As in the pre-lithiation reagent particles 100 and 125 of FIGS. 1A and 1B, respectively, the pre-lithiation reagent particle 150 may include the core particle 102 with a passivation coating 152 uniformly disposed thereon, where the core particle 102 may be substantially entirely composed of $Li_3N$. Further compositional and structural aspects of the core particle 102 may be as described above with reference to FIG. 1A. Additionally, it will be appreciated that a composition of the plurality of passivating particles 154 may be similar or equivalent to the composition of the passivation coating 104, as described in detail above with reference to FIG. 1A. For example, the plurality of passivating particles 154 may be composed of one or more of a secondary pre-lithiation reagent, a carbonaceous conductive additive, a non-lithium metal or a metal oxide.

As shown in FIG. 1C, the passivation coating 152 may be a discrete coating composed of a plurality of passivating particles 154. In some examples, the plurality of passivating particles 154 may coat the core particle 102 at such a high density that the passivation coating 152 may be considered to completely and uniformly cover the surface of the core particle 102. Further compositional aspects of the core particle 102 are described in detail above with reference to FIG. 1A.

The passivation coating 152 may have a maximum extent 156. Accordingly, each of the plurality of passivating particles 154 may be disposed between a surface of the core particle 102 and the maximum extent 156 of the passivation coating 152. The maximum extent 156 may be defined by a thickness 158 of the passivation coating 152, which may correspond to a largest particle size of the plurality of passivating particles 154. In some examples, the plurality of passivating particles 154 may have a narrow, normal PSD, such that each of the plurality of passivating particles 154 may be approximately similarly sized. In one example, each of the largest particle size of the plurality of passivating particles 154 and the thickness 158 of the passivation coating 152 may be less than or equal to 50 nm.

In some examples, the surface of the core particle 102 may include one or more surface structures 160. For example, the one or more surface structures 160 may be openings or cracks within the surface of the core particle 102, a size and/or depth of which may vary. Specifically, in some examples, the one or more surface structures 160 may be irregular (having different shapes and sizes, for instance). The one or more surface structures 160 may understandably increase the surface area of the core particle 102.

The plurality of passivating particles 154 may be retained in position via van der Waals molecular, mechanical, and/or other physical attractive forces, in direct contact with both one another and the core particle 102. Specifically, in some examples, at least some of the plurality of passivating particles 154 may adhere to and/or within the one or more surface structures 160 via van der Waals molecular, mechanical, and/or other physical attractive forces. As such, a size of the plurality of passivating particles 154 may be complementary to sizes of reciprocal surface structures 160 such that the plurality of passivating particles 154 may be at least partially secured therein. In some examples, the plurality of passivating particles 154 may be milled to a preselected average size (corresponding to the narrow, normal PSD, for instance). The preselected average size of the plurality of passivating particles 154 may permit retention thereof on and partially within surface structures 160 of complementary size on the surface of the core particle 102.

Though FIGS. 1A-1C depict single-layered passivation coating configurations, in other examples, a multilayered passivation coating configuration may be applied to the surface of the core particle 102. A total number of passivation coating layers and thicknesses thereof may accordingly depend on balancing protection of the core particle 102 with effective pre-lithiation of the lithium-ion battery (as discussed above), as well as other practical considerations, such as layer-to-layer adhesion, total cost, and relative processing difficulties.

One example of such a multilayered passivation coating configuration is depicted in FIG. 1D. Referring now to FIG. 1D, a schematic cross-section illustrating a pre-lithiation reagent particle 175, such as for a cathode of a lithium-ion battery, is shown. As in the pre-lithiation reagent particles 100, 125, and 150 of FIG. 1A-1C, respectively, the pre-lithiation reagent particle 175 may include the core particle 102 with at least one passivation coating uniformly disposed thereon, where the core particle 102 may be substantially entirely composed of $Li_3N$. Further compositional and structural aspects of the core particle 102 may be as described above with reference to FIG. 1A. Additionally, a composition of each passivation coating of the at least one passivation coating may be similar or equivalent to the composition and structure of the (continuous) passivation coating 104, as described in detail above with reference to FIG. 1A. Alternatively, the composition of each passivation coating of the at least one passivation coating may be similar or equivalent to the composition and structure of the (discrete) passivation coating 152, as described in detail above with reference to FIG. 1C.

As shown in FIG. 1D, the pre-lithiation reagent particle 175 may include a core particle 102 surrounded by a first passivation coating 176. In one example, the first passivation coating 176 may uniformly, continuously, and completely cover the surface of the core particle 102. Specifically, the first passivation coating 176 may be uniformly disposed on substantially 100% of the surface of the core particle 102, such that the first passivation coating 176 may be formed as a continuous layer thereon. However, in other examples, the first passivation coating 176 may be disposed on less than 100% of the surface of the core particle 102. Further, a thickness 180 of the first passivation coating 176 may be controlled during passivation of the core particle 102 to less than or equal to 20 nm, for example.

In some examples, the first passivation coating 176 may be a discrete coating composed of a plurality of passivating particles (not shown at FIG. 1D). In such examples, the plurality of passivating particles may coat the core particle 102 at such a high density that the first passivation coating 176 may be considered to completely and uniformly cover the surface of the core particle 102.

As further shown in FIG. 1D, the first passivation coating 176 may be surrounded by a second passivation coating 178. In one example, the second passivation coating 178 may uniformly, continuously, and completely cover the first passivation coating 176. Specifically, the second passivation coating 178 may be uniformly disposed on substantially 100% of the first passivation coating 176, such that the second passivation coating 178 may be formed as a continuous layer thereon. However, in other examples, the second passivation coating 178 may be disposed on less than 100% of the first passivation coating 176. Further, a thickness 182 of the second passivation coating 178 may be controlled during coating of the first passivation coating 176 to less than or equal to 20 nm, for example.

In some examples, the second passivation coating 178 may be a discrete coating composed of a plurality of passivating particles (not shown at FIG. 1D). In such examples, the plurality of passivating particles may coat the first passivation coating 176 at such a high density that the second passivation coating 178 may be considered to completely and uniformly cover the first passivation coating 176.

In some examples, the second passivation coating 178 may be provided to ensure that 100% of the surface of the core particle 102 is uniformly covered to a desired thickness. For example, the thickness 180 of one or more regions of the first passivation coating 176 may be less than desired or there may be one or more gaps in the first passivation coating 176. Accordingly, the second passivation coating 178 may be coated on the core particle 102 previously coated with the first passivation coating 176 to provide uniform, complete, and continuous coverage of the core particle 102.

In some examples, the second passivation coating 178 may have a different composition from the first passivation coating 176. For example, a composition of the second passivation coating 178 may be selected to dissolve/degrade into the electrolyte during initial cycling of the lithium-ion battery and the first passivation coating 176 may be selected to be retained at the cathode.

In some examples, the first passivation coating 176 may be a discrete coating composed of the plurality of passivating particles and the second passivation coating 178 may be a uniform and continuous layer completely surrounding the (discrete) first passivation coating 176. In other examples, the first passivation coating 176 may be a uniform and continuous layer completely surrounding the core particle 102 and the second passivation coating 178 may be a discrete coating composed of the plurality of passivating particles. In other examples, each of the first and second passivation coatings 176, 178 may be discrete coatings composed of the plurality of passivating particles. In other examples, the first passivation coating 176 may be the uniform and continuous layer completely surrounding the core particle 102 and the second passivation coating 178 may be the uniform and continuous layer completely surrounding the first passivation coating 176.

Referring now to FIG. 2, a schematic illustration depicting an exemplary pre-lithiation process 200 in a lithium-ion battery is shown. Though the pre-lithiation reagent particle 100 of FIG. 1A is depicted as a sacrificial lithium source for the pre-lithiation process 200, in alternative embodiments, any one of the pre-lithiation reagent particles 125, 150, 175 of FIGS. 1B-1D, respectively, may be substituted. As described in detail above with reference to FIG. 1A, the pre-lithiation reagent particle 100 may include a core particle 102 surrounded by a passivation coating 104, the core particle 102 composed of a primary pre-lithiation reagent ($Li_3N$) and the passivation coating 104 composed of a secondary pre-lithiation reagent, a cathode catalyst (to catalyze decomposition of the secondary pre-lithiation reagent, in some examples), a carbonaceous conductive additive, an organic material, a polymer salt, a non-lithium metal (or metal oxide), or a combination thereof.

The core particle 102 and optionally the passivation coating 104 may decompose via decomposition 225, such that at least two decomposition products may be produced. The at least two decomposition products may originate from the core particle 102 alone or both the core particle 102 and the passivation coating 104. As such, the at least two decomposition products may include (sacrificial) $Li^+$ ions 256.

More specifically, following the decomposition 225, a pre-lithiation reagent particle 250 may remain. In one example, the pre-lithiation reagent particle may include an at least partially depleted core particle 252 surrounded by a passivation coating 254 (which may or may not be at least partially depleted as a result of the decomposition 225), having released at least the $Li^+$ ions 256 and $N_2$ gas 258. The $Li^+$ ions 256 and the $N_2$ gas 258 may be decomposition products of the core particle 102. Because the core particle 102 may be designed to substantially entirely decompose (depending on battery environment, passivation coating thickness, etc.), the decomposition 225 may be considered a partial decomposition (for example, partway through initial cycling of the lithium-ion battery), and the pre-lithiation reagent particle 250 may represent a product of the partial decomposition.

The $Li^+$ ions 256 and the $N_2$ gas 258 may be decomposition products of the core particle 102. However, in some examples, such as when the passivation coating 104 includes the secondary pre-lithiation reagent, at least some of the $Li^+$ ions 256 may originate from decomposition of the passivation coating 104. In such examples, decomposition of the passivation coating 104 may further result in additional gaseous residue 260. For example, when the passivation coating 104 includes $Li_2O_2$ as the secondary pre-lithiation reagent, decomposition of the passivation coating 104 may generate at least some of the $Li^+$ ions 256 and the additional gaseous residue 260, the additional gaseous residue 260 being $O_2$ gas. Both the $N_2$ gas 258 and the additional gaseous residue 260 may be removed from the lithium-ion battery via a degassing step (for example, when the lithium-ion battery is formed in a pouch cell configuration, degassing may be realized via compressive rolling).

In additional or alternative examples, such as when the passivation coating 104 includes the cathode catalyst or the organic material, a non-gaseous residue 262 may be produced. In such examples, the non-gaseous residue 262 may dissolve into an electrolyte of the lithium-ion battery, having substantially no impact on electrochemical performance.

In additional or alternative examples, such as when the passivation coating 104 includes the carbonaceous conductive additive, the polymer salt, or the non-lithium metal, at least some of the passivation coating 104 may remain even following complete decomposition. In such examples, a composition of the passivation coating 104 may be selected to improve, or have substantially no impact on, electrochemical performance. In examples wherein the passivation coating 104 includes only non-residue forming components, substantially all of the passivation coating 104 may remain following the decomposition 225 (as the passivation coating 254, for example).

Following complete decomposition of the pre-lithiation reagent particle 100, a void may remain in an electrode (for example, coated cathode structure 300 in FIGS. 3A-3B) including the pre-lithiation reagent particle 100 (that is, where the pre-lithiation reagent particle 100 was positioned prior to decomposition). The void may be surrounded by at least some of the passivation coating 104 (the passivation coating 254, for example) in examples where the passivation coating 104 has not completely decomposed during the pre-lithiation process 200. As such, the passivation coating 104 may be semi-permeable, allowing the $Li^+$ ions 256 and the $N_2$ gas 258 to pass therethrough in a well-dispersed manner upon decomposition of the core particle 102.

In some examples, the pre-lithiation reagent particle 100 may be included in a cathode of the lithium-ion battery, for example, in a slurry-coated layer of the cathode (such as in the layered configurations described in detail below with reference to FIGS. 3A and 3B). As such, during the pre-lithiation process 200, the $Li^+$ ions may pass through the passivation coating 104, and from the cathode, to pre-lithiate an anode of the lithium-ion battery.

Referring now to FIG. 3A, a schematic cross-section illustrating an exemplary coated cathode structure 300 for use in a lithium-ion battery is shown. Upon formation, the coated cathode structure 300 may be positioned in the lithium-ion battery such that the coated cathode structure 300 may provide power to the lithium-ion battery. In some examples, the lithium-ion battery may be one of a plurality of lithium-ion battery cells in a lithium-ion battery pack, where each of the plurality of lithium-ion battery cells may have a substantially similar configuration to one another.

The coated cathode structure 300 may include a current collector 302 having a first side 310 and a second side 312, where the sides 310, 312 are opposite one another. The current collector 302 may have a coating layer 304 disposed on one or both of the sides 310, 312, the coating layer 304 being in face-sharing contact with the current collector 302. As such, sequentially along an axis 308 parallel to a smallest dimension of the current collector 302, the coated cathode structure 300 may include the coating layer 304, the current collector 302, and the coating layer 304 (that is, the current collector 302 may be interposed between two coating layers 304 of like configuration).

The current collector 302 may be a metal sheet or foil such as Cu foil, Ni foil, Al foil, etc., or any other configuration which may conduct electricity and permit current flow therethrough. In one example, a thickness of the current collector 302 may be about 10 µm. However, it will be appreciated that the thickness of the current collector 302 may vary widely, for example, up to 500 µm. As used herein, "about" when referring to a numerical value may encompass a deviation of 5% or less.

In some examples, the coating layer 304 may be a slurry-based layer composed of a binder, a cathode active material, a passivated pre-lithiation reagent, and optionally a conductive additive. In some examples, the passivated pre-lithiation reagent may include $Li_3N$ particles (as a primary pre-lithiation reagent) coated with a passivation coating composed of a secondary pre-lithiation reagent, a carbonaceous material, an organic material, a polymer salt, a non-lithium metal (or metal oxide), or a combination thereof.

In some examples, the binder may include one or more polymers. For example, the binder may include one or more of polyvinylidene fluoride (PVDF), polyvinyl pyrrolidone (PVP), PEO or cross-linked PEO, polytetrafluoroethylene (PTFE), PMMA, poly(acrylic acid) (PAA), PVDF-HFP, one or more conductive polymers such as poly(3,4-ethylenedioxythiophene) (PEDOT), PEDOT polystyrene sulfonate (PEDOT:PSS), and the like, a cellulosic derivative, and a linear, semi-aromatic, or aromatic polyimide (PI). In examples where the binder includes PVDF, $Li_3N$ may still be used in the passivated pre-lithiation reagent (though $Li_3N$ may be substantially incompatible with PVDF), as the $Li_3N$ may be passivated by the passivation coating.

In some examples, the conductive additive may be carbonaceous. For example, the conductive additive may include carbon black, graphene, graphene oxide, and/or CNTs. In examples where the passivation coating also includes a carbonaceous material, the conductive additive may be of a same or different composition as the carbonaceous material of the passivation coating. Further, in such examples, an amount of the conductive additive in the coating layer 304 may be reduced or eliminated due to the presence of the carbonaceous material in the passivation coating (which may serve a similar purpose in the lithium-ion battery).

In some examples, the cathode active material may include a lithium insertion material. For example, the lithium insertion material may include one or more of lithium nickel cobalt manganese oxide (NCM or NMC), a lithium iron phosphate (LFP), a lithium manganese iron phosphate (LMFP), a lithium nickel cobalt aluminum oxide (NCA), a lithium cobalt oxide (NCO), a lithium manganese nickel oxide (LMN), a lithium manganese oxide (LMO), a lithium cobalt phosphate (LCP), a lithium nickel phosphate (LNP), and a lithium manganese phosphate (LMP), and/or any number of other lithium insertion materials known to those of ordinary skill in the art. In one example, the cathode active material may be a lithium mixed metal oxide layered structured material. In some examples, and as described in detail below with reference to FIGS. 4A and 4B, the cathode active material may be in particulate form and coated with passivated $Li_3N$ particles, such that no separate pre-lithiation reagent may be utilized. In other examples, and as described in detail below with reference to FIG. 4C, the cathode active material may be in particulate form and coated with pristine (non-passivated) $Li_3N$ particles, and a passivation coating may be further coated on the $Li_3N$-coated cathode active material.

After the coating layer 304 is coated and calendered, a thickness thereof along the axis 308 may be determined. In some examples, the thickness of the coating layer 304 may be greater than or equal to 50 µm and less than or equal to 500 µm.

In some examples, the pre-lithiation reagent may be included in a separate coating layer from the cathode active material to minimize an impact of adding the pre-lithiation reagent on mechanical and electrochemical integrity of the coated cathode structure. For example, the cathode active material may be included in a layer closer to the current collector and the pre-lithiation reagent may be included in a layer further from the current collector. As another example, the pre-lithiation reagent may be included in the layer closer to the current collector and the cathode active material may be included in the layer further from the current collector.

One example of such a multilayered cathode structure is depicted in FIG. 3B. Referring now to FIG. 3B, a schematic cross-section illustrating an exemplary coated cathode structure 350 for use in a lithium-ion battery is shown. Upon formation, the coated cathode structure 350 may be positioned in the lithium-ion battery such that the coated cathode structure 350 may provide power to the lithium-ion battery. In some examples, the lithium-ion battery may be one of a plurality of lithium-ion battery cells in a lithium-ion battery pack, where each of the plurality of lithium-ion battery cells may have a substantially similar configuration to one another.

The coated cathode structure 350 may include the current collector 302 (as described in detail above with reference to FIG. 3A) having a first side 310 and a second side 312, where the sides 310, 312 are opposite one another. The current collector 302 may have a first coating layer 352 disposed on one or both of the sides 310, 312, the first coating layer 352 being in face-sharing contact with the current collector 302. Further, on one or both of the sides 310, 312 a second coating layer 354 may be disposed on the first coating layer 352, such that the second coating layer 354 may be in face-sharing contact with the first coating layer 352 and the first coating layer 352 may be interposed between the current collector 302 and the second coating layer 354. As such, sequentially along an axis 358 parallel to the smallest dimension of the current collector 302, the coated cathode structure 350 may include the second coating layer 354, the first coating layer 352, the current collector 302, the first coating layer 352, and the second coating layer 354.

In a first example, the first coating layer 352 may be a slurry-based layer composed of a binder, a cathode active material, and optionally a conductive additive, and the second coating layer 354 may be a slurry-based layer composed of the binder, a passivated pre-lithiation reagent, and optionally the conductive additive. In a second example, the first coating layer 352 may be a slurry-based layer composed of the binder, the passivated pre-lithiation reagent, and optionally the conductive additive, and the second coating layer 354 may be a slurry-based layer composed of the binder, the cathode active material, and optionally the conductive additive. In the first and second examples, the cathode active material and the passivating pre-lithiation reagent may not be included in the same coating layer 352 or 354. As such, one of the coating layers 352, 354 may provide lithium insertion/deinsertion functionalities and the other one of the coating layers 352, 354 may provide pre-lithiation functionalities.

In a third example, the first coating layer 352 may be may be a slurry-based layer composed of a binder, a cathode active material, a passivated pre-lithiation reagent, and optionally a conductive additive and the second coating layer 354 may be a slurry-based layer composed of a binder, a cathode active material, and optionally a conductive additive. The passivated pre-lithiation reagent and the cathode active material are therefore implemented in the same coating layer.

In a fourth example, the first coating layer 352 may be a slurry-based layer composed of a binder, a cathode active material, and optionally a conductive additive and the second coating layer 354 may be a slurry-based layer composed of a binder, a cathode active material, a passivated pre-lithiation reagent, and optionally a conductive additive. As such, both coating layers include the cathode active material but only one coating layer has the pre-lithiation reagent.

In a fifth example, both the first coating layer 352 and the second coating layer 354 may be a slurry-based layer composed of a binder, a cathode active material, a passivated pre-lithiation reagent, and optionally a conductive additive. While each coating layer includes the same materials, relative amounts of binder, cathode active material, passivated pre-lithiation reagent, and optionally conductive additive may vary between first coating layer 352 and second coating layer 354. For example, first coating layer 352 may have a higher weight percentage of cathode active material than a weight percentage of the passivated pre-lithiation reagent and second coating layer 354 may have a higher weight percentage of the passivated pre-lithiation reagent than the weight percentage of the cathode active material.

Respective compositions of the binder, the cathode active material, the conductive additive, and the passivated pre-lithiation reagent may be as described above with reference to FIG. 3A. For example, and as described in detail above with reference to FIG. 3A, an amount of the conductive additive may be reduced or eliminated when a passivation coating of the passivating pre-lithiation reagent includes a carbonaceous material serving a similar function.

After the coating layers 352, 354 are coated and calendered, thicknesses thereof along the axis 358 may be determined. In some examples, the thickness of each of the coating layers 352 and 354 may be greater than or equal to 50 μm and less than or equal to 500 μm. In some examples, the thickness of the coatings 352 and/or 354 may be greater than or equal to 1 μm and less than or equal to 10 μm n. In some examples, the thickness of the coatings 352 and/or 354 may be greater than or equal to 10 μm and less than or equal to 50 μm.

Referring now to FIG. 4A, a schematic cross-section illustrating a coated cathode active material particle 400, such as for a cathode of a lithium-ion battery, is shown. The coated cathode active material particle 400 may include a core particle 402 surrounded by a pre-lithiation coating 404. As shown, the pre-lithiation coating 404 may be a discrete coating composed of a plurality of pre-lithiation reagent particles 100 (for example, passivated $Li_3N$ core particles). Compositional and configurational aspects of the pre-lithiation reagent particles 100 are described in detail above with reference to FIG. 1A.

The core particle 402 may be substantially entirely composed of a cathode active material, such as a lithium insertion material. The lithium insertion material may include a lithiated compound, such as a lithium metal oxide, a lithium phosphate compound, or a combination thereof, but is not limited to these types of electrochemically active materials. As non-limiting examples of lithiated compounds, the core particle 402 may include one or more of NMC, LFP, LMFP, NCA, NCO, LMN, LMO, LCP, LNP, and LMP. In one example, the core particle 402 may be substantially entirely composed of a lithium mixed metal oxide layered structured material.

In some examples, an average size (for example, a D50 size) of the core particles 402 may be greater than or equal to 5 μm and less than or equal to 15 μm. In some examples, a relationship between multiple core particles 402 may be formed such that each core particle 402 may have a similar size. In some examples, the core particle 402 may be a larger, secondary particle composed of smaller, primary particles. Specifically, each secondary particle may include a plurality of primary particles.

The pre-lithiation coating 404 may have a maximum extent 406. Accordingly, each of the plurality of pre-lithiation reagent particles 100 may be disposed between a surface of the core particle 402 and the maximum extent 406 of the pre-lithiation coating 404. The maximum extent 406 may be defined by a thickness 408 of the pre-lithiation coating 404, which may correspond to a largest particle size of the plurality of pre-lithiation reagent particles 100. The largest particle size of the plurality of pre-lithiation reagent particles 100 may be based on the largest cross-sectional dimension of the core particle 102 and a maximum thickness of the passivation coating 104, as described above with reference to FIG. 1A. For example, the thickness 408 of the pre-lithiation coating 404 may be less than or equal to 500 nm.

In some examples, the surface of the core particle 402 may include one or more surface structures 410. For example, the one or more surface structures 410 may be openings or cracks within the surface of the core particle 402, a size and/or depth of which may vary. Specifically, in some examples, the one or more surface structures 410 may be irregular (having different shapes and sizes, for instance). The one or more surface structures 410 may understandably increase the surface area of the core particle 402.

The plurality of pre-lithiation reagent particles 100 may be retained in position via van der Waals molecular, mechanical, and/or other physical attractive forces, in direct contact with both one another and the core particle 402. Specifically, in some examples, at least some of the plurality of pre-lithiation reagent particles 100 may adhere to and/or within the one or more surface structures 410 via van der Waals molecular, mechanical, and/or other physical attractive forces. As such, a size of the plurality of pre-lithiation reagent particles 100 may be complementary to sizes of reciprocal surface structures 410 such that the plurality of pre-lithiation reagent particles 100 may be at least partially secured therein. In some examples, the plurality of pre-lithiation reagent particles 100 may be milled to a preselected average size prior to a passivation step or in between passivation steps (corresponding to a predetermined PSD, for instance). The preselected average size of the plurality of pre-lithiation reagent particles 100 may permit retention on and partially within surface structures 410 of complementary size on the surface of the core particle 402.

Though shown mechanically bound in FIG. 4A, in some examples, the pre-lithiation reagent particles may instead be chemically bound to a surface of the cathode active material particle or adhered to the surface of the cathode active material particle with a binder. One exemplary coating configuration is depicted in FIG. 4B. Referring now to FIG. 4B, a schematic cross-section illustrating a coated cathode active material particle 425, such as for a cathode of a lithium-ion battery, is shown. As in the coated cathode active material particle 400 of FIG. 4A, the coated cathode active material particle 425 may include the core particle 402 surrounded by a pre-lithiation coating 428, where the core particle 402 may be substantially entirely composed of a cathode active material (for example, a lithium insertion material). Further compositional and configurational aspects of the core particle 402 are described in detail above with reference to FIG. 4A.

The pre-lithiation coating 428 may be include a binder 426 adhering, binding, or annealing a plurality of pre-lithiation reagent particles 100 (for example, passivated $Li_3N$ core particles) to one another and to a surface of the core particle 402. Compositional and configurational aspects of the pre-lithiation reagent particles 100 are described in detail above with reference to FIG. 1A.

In some examples, the binder 426 may include one or more of PVDF, PVP, PEO or cross-linked PEO, PTFE, PMMA, PAA, PVDF-HFP, one or more conductive polymers (e.g., PEDOT, PEDOT:PSS, etc.), a cellulosic derivative, and a linear, semi-aromatic, or aromatic PI. In one example, the binder 426 may include an aromatic PI which is crosslinkable via heat treatment at around 350° C. As such, the binder 426 may confer increased partial electrical conductivity to the lithium-ion battery. In examples where the binder 426 includes PVDF, $Li_3N$ may still be used in the plurality of pre-lithiation reagent particles 100 (though $Li_3N$ may be substantially incompatible with PVDF), as the $Li_3N$ may be passivated by a passivation coating (as described in detail above with reference to FIG. 1A). Further, PVDF may gel and facilitate formation of a three-dimensional structural network by fixing the plurality of pre-lithiation reagent particles 100 in place, thereby further strengthening the pre-lithiation coating 428. It will be appreciated that the beneficial effects ascribed to PVDF within the pre-lithiation coating 428 may contrast with inclusion of PVDF as a separate binder between multiple coated cathode active material particles 425 in a finally-formed cathode slurry, as gelation may not be desirable during manufacture of the cathode slurry.

The pre-lithiation coating 428 may have a maximum extent 430. Accordingly, each of the plurality of pre-lithiation reagent particles 100 may be disposed between a surface of the core particle 402 and the maximum extent 430 of the pre-lithiation coating 428. The maximum extent 430 may be defined by a thickness 432 of the pre-lithiation coating 428, which may be less than or equal to 500 nm, in one example.

Though the pre-lithiation coatings 404 and 428 of FIGS. 4A and 4B, respectively, are described hereinabove as including the pre-lithiation reagent particles 100 of FIG. 1A, it should be appreciated that the pre-lithiation reagent particles 125, 150, and 175 of FIGS. 1B-1D, respectively, may be substituted independently or in any combination desired. In other examples, pristine (non-passivated) $Li_3N$ particles may instead be coated on the cathode active material particle and a passivation coating may be applied to the $Li_3N$-coated core particle.

One exemplary coating configuration is depicted in FIG. 4C. Referring now to FIG. 4C, a schematic cross-section illustrating a coated cathode active material particle 450, such as for a cathode of a lithium-ion battery, is shown. As in the coated cathode active material particles 400 and 425 of FIGS. 4A and 4B, respectively, the coated cathode active material particle 450 may include the core particle 402 surrounded by a pre-lithiation coating 456, where the core particle may be substantially entirely composed of a cathode active material (for example, a lithium insertion material). Further compositional and configurational aspects of the core particle 402 are described in detail above with reference to FIG. 4A.

The pre-lithiation coating 456 may include a binder 452 adhering, binding, or annealing a plurality of $Li_3N$ particles 102 (which may function as core particles in the pre-lithiation reagent particles 100, 125, 150, and 175 of FIGS. 1A-1D, respectively, for example) to one another and to a surface of the core particle 402. As included within the pre-lithiation coating 456, and as shown, the plurality of $Li_3N$ particles 102 may be substantially pure and unpassivated. Compositional and configurational aspects of the $Li_3N$ particles 102 are described in detail above with reference to FIG. 1A. Additionally, it will be appreciated that a composition of the binder 452 may be similar or equivalent to the composition of the binder 426, as described in detail above with reference to FIG. 4B.

The pre-lithiation coating 456 may further include a passivation coating 454 surrounding the core particle 402 coated with the binder 452 and the plurality of $Li_3N$ particles 102. As shown in FIG. 4C, the passivation coating 454 may be in direct contact with the binder 452, as well as surfaces of the plurality of $Li_3N$ particles 102 left exposed during binding thereof to the core particle 402 with the binder 452. As such, the plurality of $Li_3N$ particles 102 may be protected from degradation during slurry processing and may therefore be substantially preserved for pre-lithiation of the lithium-ion battery.

In some examples, a thickness 458 of the passivation coating 454 may be controlled during passivation of the core particle 402 coated with the binder 452 and the plurality of $Li_3N$ particles 102 such that the passivation coating 454 may not be so thick as to significantly hamper a rate of pre-lithiation and not so thin as to provide inadequate passivation during slurry processing. As such, the thickness 458 of the passivation coating 454 may be less than or equal to 50 nm, for example.

It will be appreciated that a thickness 460 of the pre-lithiation coating 456 may be greater than the thickness 458 of the passivation coating 454. However, the thickness 460 of the pre-lithiation coating 456 may still have a practical upper limit. For example, the thickness 460 of the pre-lithiation coating 456 may be less than or equal to 500 nm.

Each of the pre-lithiation coatings 404, 428, and 456 of FIGS. 4A, 4B, and 4C, respectively, are described above as being formed from a plurality of particulates mechanically or chemically bound, the plurality of particulates including the plurality of (pristine) $Li_3N$ particles 102 or the plurality of pre-lithiation reagent particles 100, 125, 150, or 175. However, it will be appreciated that the plurality of particulates may include further particulate species, such as cathode catalyst particles, conductive carbon particles, binder particles, pre-lithiation reagent particles including non-$Li_3N$ core particles, or combinations thereof. Specific compositions of the cathode catalyst, the conductive carbon, the binder, and the secondary pre-lithiation reagent are not particularly limited, and may respectively include any of the cathode catalyst, conductive carbon, binder, and pre-lithiation reagent compositions described herein.

For example, and as shown at FIG. 4C, at least some of the plurality of particulates forming the pre-lithiation coating 456 may be a plurality of additive particles 462. In some examples, the plurality of additive particles 462 may be composed of a cathode catalyst, conductive carbon, a binder (e.g., having a different or same composition as the binder 452), a secondary (e.g., non-$Li_3N$) pre-lithiation reagent, or a combination thereof. However, in other examples, the plurality of $Li_3N$ particles 102 may be the only particulates included in the pre-lithiation coating 456.

Similarly, in further examples, the plurality of particulates forming the pre-lithiation coating may include the plurality of pre-lithiation reagent particles (e.g., passivated $Li_3N$ particles) and the plurality of additive particles. For instance, the pre-lithiation coatings 404 and 428 of FIGS. 4A and 4B, respectively, may include a plurality of additive particles in addition to the pre-lithiation reagent particles 100. It should thus be appreciated that, in some examples, the pre-lithiation coating may include the (passivated) pre-lithiation reagent particles 100, the (unpassivated) $Li_3N$ particles 102, the additive particles, or combinations thereof. Alternatively, and as shown at FIGS. 4A and 4B, the pre-lithiation reagent particles 100 may be the only particulates included in the pre-lithiation coatings 404 and 428.

Referring now to FIG. 5, a flow chart of a method 500 is depicted for manufacturing a cathode slurry for forming a layered cathode, where the cathode slurry may include passivated $Li_3N$ particles. As discussed below at 506, passivation of $Li_3N$ particles may be realized via various passivation coating processes, as dependent on a desired composition of a finally-formed passivation coating. Specific steps, step orderings, and parameters of the passivation coating processes may be calibrated so as to reproducibly obtain a suitably thin and uniform passivation coating.

It will be appreciated that the method 500 may be described in relation to the components described in detail above with reference to FIGS. 1A-4C. For example, the passivated $Li_3N$ particles may be the pre-lithiation reagent particles 100, 125, 150, or 175 of FIGS. 1A-1D, or the $Li_3N$ particles may be included in coated cathode active material particles, such as the coated cathode active material particles 400, 425, or 450 of FIGS. 4A-4C.

Further, though the passivation coating processes described herein are directed to use of passivated $Li_3N$ particles as pre-lithiation reagents, it will be appreciated that at least some of the passivation coating processes may be adapted to passivation of particles of partial $Li_3N$ composition, or particles including substantially no $Li_3N$ at all. For example, at least some of the passivation coating processes described in detail below with reference to FIGS. 6-11 may be applied to other particles besides pristine $Li_3N$ particles.

Moreover, though the embodiments described herein are directed to formation of cathodes including pre-lithiation reagents therein, it will be appreciated that at least some of the embodiments described herein may be adapted to formation of anodes. For example, FIG. 5 may be adapted to manufacture of an anode slurry for forming a layered anode, where the anode slurry may include passivated $Li_3N$ particles. FIGS. 6-11 may accordingly describe specific passivation coating processes at least partially interchangeable within such anode formation.

At 502, the method 500 includes selecting a passivation precursor for forming a uniform passivation coating via a passivation coating process. In some examples, the passivation precursor may include one or more precursor compounds of differing chemical or structural configuration than as included in the finally-formed passivation coating (that is, following chemical/physical manipulation by the passivation coating process). In other examples, the passivation precursor may not be chemically altered during the passivation coating process and may include would-be passivators not yet coated onto surfaces of the $Li_3N$ particles.

At 504, the method 500 optionally includes coating a cathode active material with the $Li_3N$ particles. The $Li_3N$ particles may be physically (e.g., via van der Waals forces, mechanical forces, etc.) or chemically (e.g., via chemical bonds) bound to surfaces of the cathode active material, or adhered to the surfaces of the cathode active material via a binder. In such examples, the $Li_3N$-coated cathode active material may instead undergo the passivation coating process. Exposed surfaces of the $Li_3N$ particles coated on the cathode active material may accordingly be passivated via the passivation coating process.

At 506, the method 500 includes passivating the $Li_3N$ particles with the uniform passivation coating based on the selected precursor. As discussed above, a specific passivation coating process may be dependent on selection of the passivation precursor. Specifically, the chemical and physical properties of the passivation precursor may be well-suited to a particular passivation coating process. Exemplary embodiments of the passivation coating process are discussed below in detail with reference to FIGS. 6-11. As non-limiting examples, passivation may be realized via reaction with a passivating atmosphere, mechanical blending, heat treatment, reactive sputtering, wet coating, polymerization, or surface-reactive processes, or a combination thereof.

It will be appreciated that the $Li_3N$ particles may be milled to a desired average size prior to passivation at 506 (or coating on the cathode active material at 504). For example, $Li_3N$ precursor particles may be dispersed in one or more solvents in a wet milling process. The one or more solvents may be anhydrous so as to mitigate chemical degradation of the $Li_3N$ particles during milling. In some examples, an additional milling step may occur following passivation to expose additional $Li_3N$ surfaces for further passivation.

At 508, the method 500 optionally includes coating the cathode active material with the passivated $Li_3N$ particles. The passivated $Li_3N$ particles may be mechanically bound or adhered to surfaces of the cathode active material via a binder. In such examples, the coated $Li_3N$ particles (and optionally the binder) may be considered to form a pre-lithiation coating on the cathode active material.

At 510, the method 500 includes forming a cathode slurry including the passivated $Li_3N$ particles (or the coated cathode active material) dispersed in a solvent. In some examples, depending on a composition of the passivated $Li_3N$ particles, the cathode slurry may further include one or more of a binder, a conductive additive, and a cathode active material. Relative amounts of the passivated $Li_3N$ particles, the binder, the conductive additive, and the cathode active material may be selected to control for a viscosity and thereby a solids content of the cathode slurry. In one example, ball mill mixing may be employed to achieve homogeneous dispersion of the passivated $Li_3N$ particles among other slurry components and spatially within a finally-formed cathode.

At 512, the method 500 includes casting the cathode slurry onto a cathode structure to form a slurry-coated cathode structure. In some examples, the cathode structure may include only a current collector, such as aluminum foil. In other examples, the cathode structure may further include a cathode layer preformed on the current collector. For example, the cathode layer may include the cathode active material, such that the passivated $Li_3N$ particles may be included in a separate layer in the finally-formed cathode. Numerous slurry-based coating processes may be utilized without departing from the scope of the present disclosure, including, but not limited to, slot-die coating, roll-to-roll coating (e.g., gravure coating, screen printing, flexographic printing), doctor-blade casting, tape casting, spray (aerosol) coating, reverse comma coating, etc.

At 514, the method 500 includes drying the slurry-coated cathode structure. Drying the slurry-coated cathode structure may include evaporating the solvent at a relatively low temperature (for example, 200° C. or less).

At 516, the method 500 includes calendering the dried slurry-coated cathode structure. In this way, a cathode may be formed including $Li_3N$ particles having a thin, uniform, and reproducible passivation coating disposed thereon.

Figure 6:
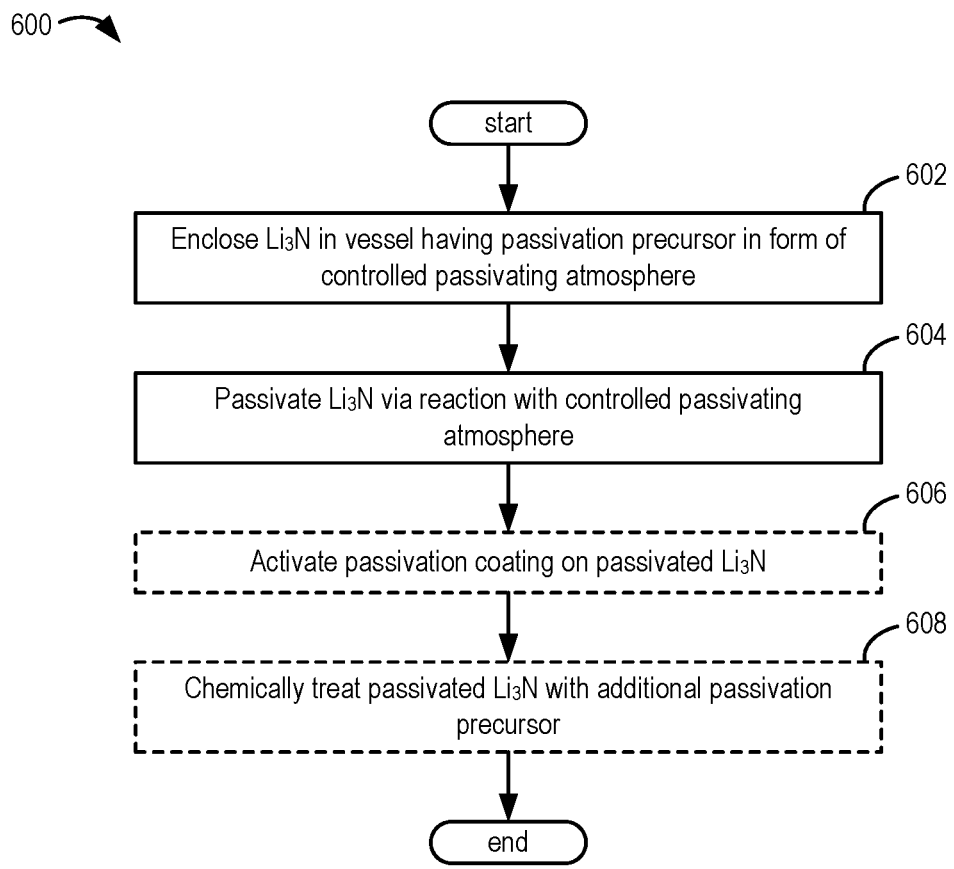
FIG. 6 shows a flow chart of a first exemplary method for passivating $Li_3N$ particles, including passivation of the $Li_3N$ particles via reaction with a passivating atmosphere.

Referring now to FIG. 6, a flow chart of a method 600 is depicted for passivating $Li_3N$ particles via reaction with a controlled passivating atmosphere. Accordingly, and as discussed above, the steps of the method 600 may substitute step 506 of the method 500, as described in detail above with reference to FIG. 5. Further, it will be appreciated that the method 600 may be described in relation to the components described in detail above with reference to FIGS. 1A-4C. For example, the passivated $Li_3N$ particles may be the pre-lithiation reagent particles 100, 125, 150, or 175 of FIGS. 1A-1D, or the $Li_3N$ particles may be included in coated cathode active material particles, such as the coated cathode active material particles 400, 425, or 450 of FIGS. 4A-4C.

At 602, the method 600 includes enclosing the $Li_3N$ particles in a vessel having a passivation precursor in the form of the controlled passivating atmosphere. In some examples, the controlled passivation atmosphere may include one or more of $O_2$, carbon dioxide ($CO_2$), hydrogen sulfide ($H_2S$), and hydrogen fluoride (HF) to respectively form one or more of $Li_2O$, $Li_2CO_3$, $Li_2S$, or LiF as a secondary pre-lithiation reagent (that is, in addition to $Li_3N$ as a primary pre-lithiation reagent). In additional or alternative examples, the controlled passivating atmosphere may include one or more of acetylene and toluene vapors to form a carbonaceous conductive additive (such as carbon black).

In some examples, the $Li_3N$ particles may include cathode catalyst particles adhered thereon via mechanical blending prior to enclosing the $Li_3N$ particles in the vessel. In other examples, the cathode catalyst particles may be adhered to the $Li_3N$ particles following passivation (e.g., at 604) via mechanical blending of cathode catalyst particles with the (passivated) $Li_3N$ particles. Alternatively, the cathode catalyst may be added by flowing a cathode catalyst precursor into the vessel prior to or following the passivation of the $Li_3N$ particles.

In some examples, the controlled passivating atmosphere may be fed through the vessel. Accordingly, it will be appreciated that "enclosing" as used at 602 may refer to placement of the $Li_3N$ particles such that the $Li_3N$ particles may only be exposed to the controlled passivating atmosphere, and not necessarily that the $Li_3N$ particles are enclosed in the vessel in such a way as to be sequestered from a gas feed.

At 604, the method 600 includes passivating the $Li_3N$ particles via reaction of surfaces of the $Li_3N$ particles with the controlled passivating atmosphere. Specifically, one or more components of the controlled passivating atmosphere may be directed to (e.g., as a flow gas) and reacted with surfaces of the $Li_3N$ particles. In some examples, the $Li_3N$ particles may be subjected to the controlled passivating atmosphere at a relatively high temperature (from 20° C. to 500° C., for example) for an extended duration (from 0.5 hours to 7 days, for example). By feeding the controlled passivation atmosphere through the vessel while monitoring and adjusting a composition of the controlled passivation atmosphere, a composition of a passivation coating on the $Li_3N$ particles may be correspondingly controlled. For example, with a pure, dry $O_2$ feed, the composition of the passivation coating may primarily include $Li_2O$ following the reaction of the surfaces of the $Li_3N$ particles with the controlled passivating atmosphere.

At 606, the method 600 optionally includes activating the passivation coating on the passivated $Li_3N$ particles. For instance, in certain examples where the carbonaceous conductive additive is included in the passivation coating, activation may be realized via application of additional pressure (via mechanical pressing, for example) or ultrasonication.

At 608, the method 600 optionally includes chemically treating the passivated $Li_3N$ particles with an additional passivation precursor. Specifically, the additional passivation precursor may further react with the passivation coating on the $Li_3N$ particles. For instance, in certain examples where $Li_2O$ is included in the passivation coating, the additional passivation precursor may be hydrogen peroxide ($H_2O_2$) such that at least some $Li_2O$ may be converted to $Li_2O_2$ (which may similarly be used as a secondary pre-lithiation reagent).

Figure 7:
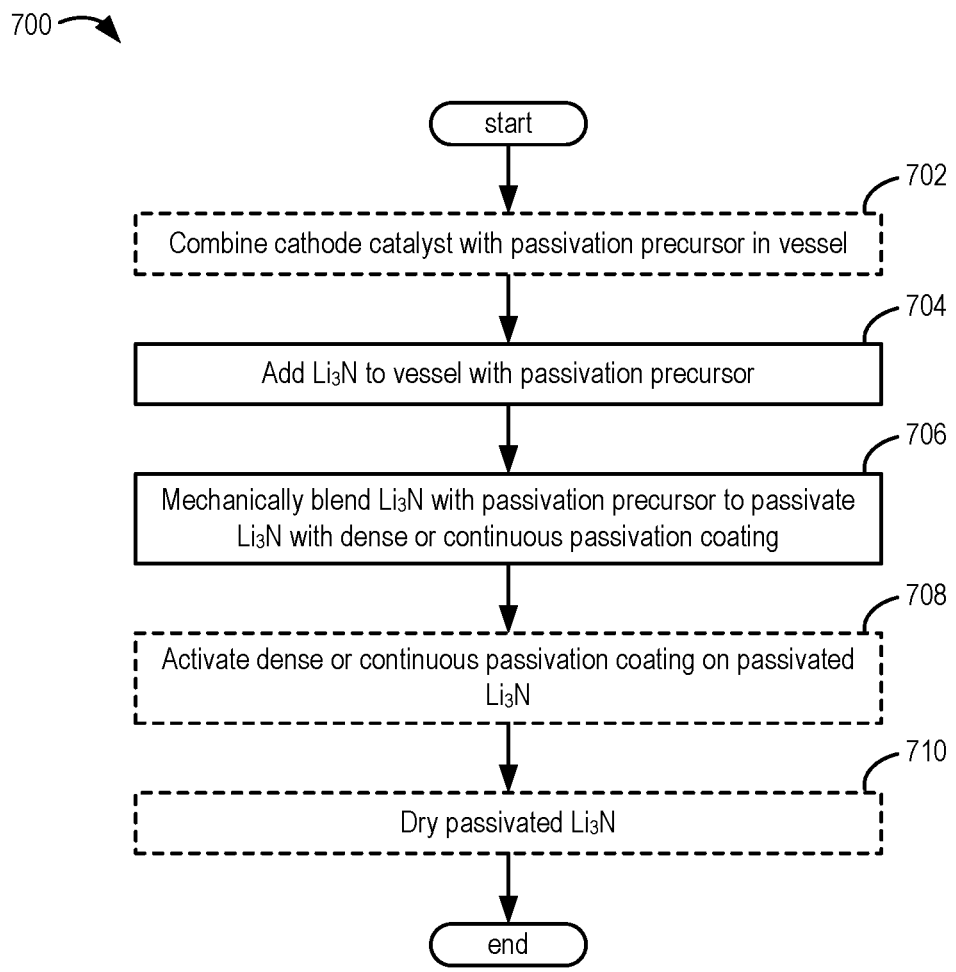
FIG. 7 shows a flow chart of a second exemplary method for passivating $Li_3N$ particles, including passivation of the $Li_3N$ particles via mechanical blending.

Referring now to FIG. 7, a flow chart of a method 700 is depicted for passivating $Li_3N$ particles via a mechanical blending process. Accordingly, and as discussed above, the steps of the method 700 may substitute step 506 of the method 500, as described in detail above with reference to FIG. 5. Further, it will be appreciated that the method 700 may be described in relation to the components described in detail above with reference to FIGS. 1A-4C. For example, the passivated $Li_3N$ particles may be the pre-lithiation reagent particles 100, 125, 150, or 175 of FIGS. 1A-1D, or the $Li_3N$ particles may be included in coated cathode active material particles, such as the coated cathode active material particles 400, 425, or 450 of FIGS. 4A-4C.

At 702, the method 700 optionally includes combining a cathode catalyst with a passivation precursor in a vessel. In some examples, the passivation precursor may include a secondary pre-lithiation reagent, such as one or more of $Li_2O$, $Li_2CO_3$, $Li_2S$, or LiF. Accordingly, in such examples, the cathode catalyst may optionally be utilized to facilitate decomposition of the secondary pre-lithiation reagent during pre-lithiation in a finally-formed lithium-ion battery. In some examples, the cathode catalyst may include one or more of $Co_3O_4$, LFP, and LMFP.

At 704, the method 700 includes adding the $Li_3N$ particles to the vessel with the passivation precursor. In some examples, the $Li_3N$ particles may be added to the vessel in inert atmospheric conditions to mitigate $Li_3N$ degradation. With 702 being optional, the cathode catalyst may or may not be present upon addition of the $Li_3N$ particles to the vessel.

At 706, the method 700 includes mechanically blending the $Li_3N$ particles with the passivation precursor to passivate the $Li_3N$ particles with a dense or continuous passivation coating. Mechanical blending may be accomplished via wet or dry milling, smearing, or mechano-fusion processes, among other mechanical blending processes. In some examples, the passivation precursor may include the secondary pre-lithiation reagent as described above at 702, which may be coated on surfaces of the $Li_3N$ particles via milling or mechano-fusion. In additional or alternative examples, the passivation precursor may include a carbonaceous conductive additive, such as one or more of carbon black, graphene, and graphene oxide, which may be coated on surfaces of the $Li_3N$ particles via mechano-fusion. In additional or alternative examples, the passivation precursor may include one or more PILs (or monomeric units thereof), which may be coated on surfaces of the $Li_3N$ particles via milling or smearing.

To sufficiently passivate the $Li_3N$ particles, a continuous, uniform coating may be disposed on a majority of the surfaces of the $Li_3N$ particles. However, in some mechanical blending processes, a discrete coating of densely and uniformly packed particulates may instead be formed, which may serve a similar function to the continuous coating achieved via other mechanical blending processes.

At 708, the method 700 optionally includes activating the passivation coating on the passivated $Li_3N$ particles. For instance, in certain examples where the carbonaceous conductive additive is included in the passivation coating, activation may be realized via application of additional pressure (via mechanical pressing, for example) or ultrasonication.

At 710, the method 700 optionally includes drying the passivated $Li_3N$ particles. For instance, in certain examples where the one or more PILs are included in the passivation coating, drying may be realized via spray drying.

Figure 8:
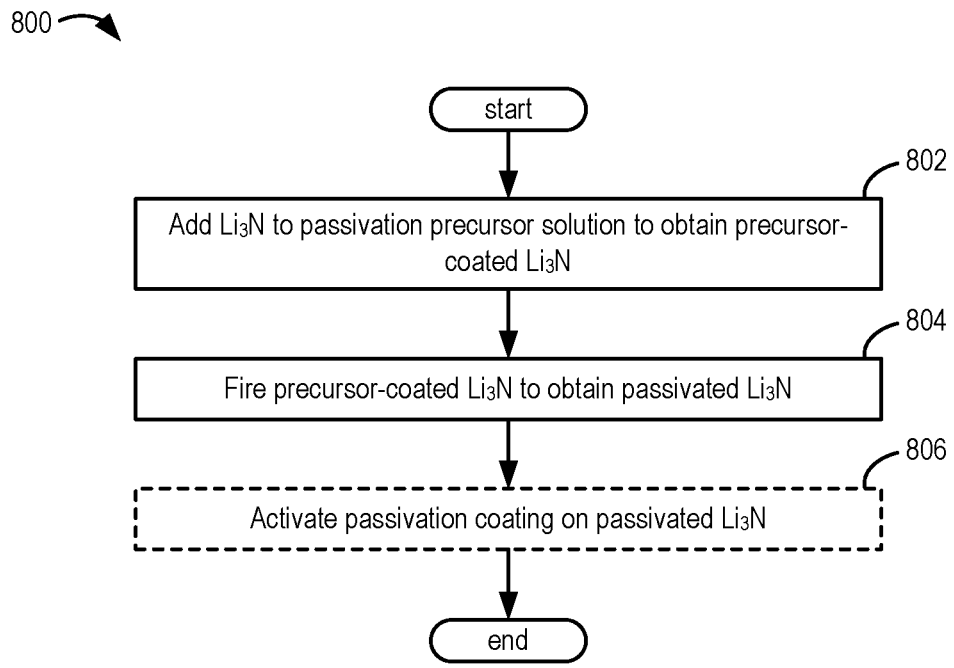
FIG. 8 shows a flow chart of a third exemplary method for passivating $Li_3N$ particles, including passivation of the $Li_3N$ particles via wet coating and firing.

Referring now to FIG. 8, a flow chart of a method 800 is depicted for passivating $Li_3N$ particles via a wet coating and firing process. Accordingly, and as discussed above, the steps of the method 800 may substitute step 506 of the method 500, as described in detail above with reference to FIG. 5. Further, it will be appreciated that the method 800 may be described in relation to the components described in detail above with reference to FIGS. 1A-4C. For example, the passivated $Li_3N$ particles may be the pre-lithiation reagent particles 100, 125, 150, or 175 of FIGS. 1A-1D, or the $Li_3N$ particles may be included in coated cathode active material particles, such as the coated cathode active material particles 400, 425, or 450 of FIGS. 4A-4C.

At 802, the method 800 includes adding the $Li_3N$ particles to a passivation precursor solution to obtain precursor-coated $Li_3N$ particles. In some examples, the $Li_3N$ particles may be added to the passivation precursor solution in inert atmospheric conditions to mitigate $Li_3N$ degradation. In some examples, the passivation precursor solution may include a carbonaceous polymeric binder (as the passivation precursor) dispersed in a compatible solvent. In such examples, the solvent in the passivation precursor solution may be gradually dried or evaporated at room temperature (~20° C.) or elevated temperature (<300° C.) with agitation to facilitate formation of a uniform precursor coating on surfaces of the $Li_3N$ particles. The inert atmospheric conditions may be maintained to protect the $Li_3N$ particles during solvent evaporation. In some examples, the passivation precursor solution may include pitch black as the passivation precursor.

At 804, the method 800 includes firing the precursor-coated $Li_3N$ particles to obtain passivated $Li_3N$ particles. Specifically, after submerging the $Li_3N$ particles in the passivation precursor solution, the $Li_3N$ particles may be coated with the passivation precursor. The precursor-coated $Li_3N$ particles may then be fired at a relatively high temperature (from 700° C. to 1200° C., for example) in an inert atmosphere to form a passivation coating on the $Li_3N$ particles, where the passivation coating may include a carbonaceous conductive additive, for example. For instance, in examples wherein the passivation precursor solution includes pitch black as the passivation precursor, firing of the precursor-coated $Li_3N$ particles at 700-1200° C. may realize a carbon passivation coating on the surfaces of the $Li_3N$ particles.

At 806, the method 800 optionally includes activating the passivation coating on the passivated $Li_3N$ particles. For instance, in certain examples where the carbonaceous conductive additive is included in the passivation coating, activation may be realized via application of additional pressure (via mechanical pressing, for example) or ultra-sonication.

Figure 9:
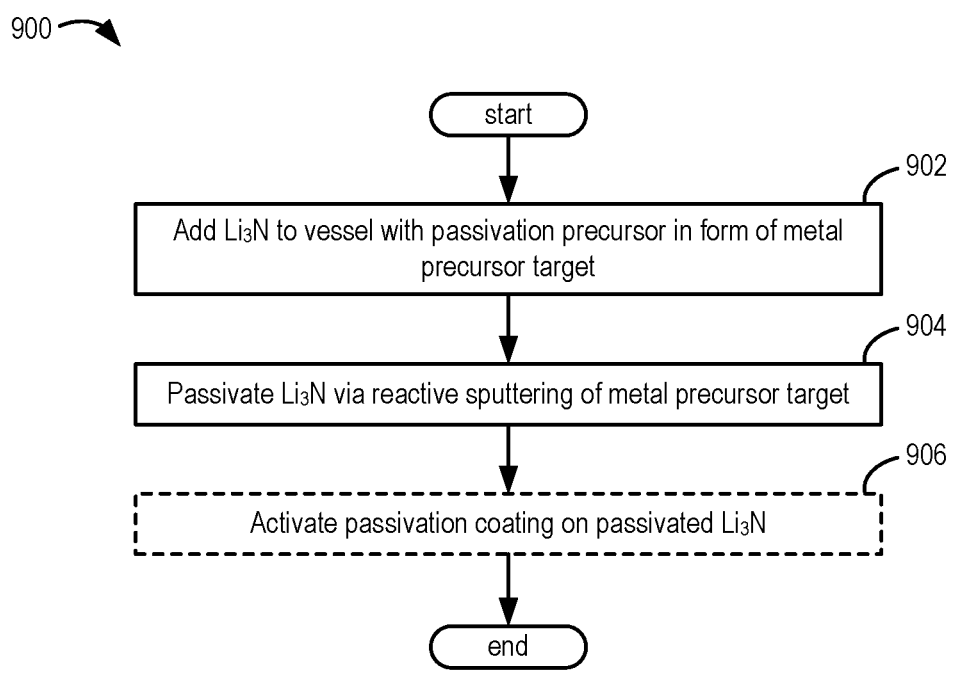
FIG. 9 shows a flow chart of a fourth exemplary method for passivating $Li_3N$ particles, including passivation of the $Li_3N$ particles via reactive sputtering.

Referring now to FIG. 9, a flow chart of a method 900 is depicted for passivating $Li_3N$ particles via a reactive sputtering process. Accordingly, and as discussed above, the steps of the method 900 may substitute step 506 of the method 500, as described in detail above with reference to FIG. 5. Further, it will be appreciated that the method 900 may be described in relation to the components described in detail above with reference to FIGS. 1A-4C. For example, the passivated $Li_3N$ particles may be the pre-lithiation reagent particles 100, 125, 150, or 175 of FIGS. 1A-1D, or the $Li_3N$ particles may be included in coated cathode active material particles, such as the coated cathode active material particles 400, 425, or 450 of FIGS. 4A-4C.

At 902, the method 900 includes adding the $Li_3N$ particles to a vessel with a passivation precursor in the form of a metal precursor target. In some examples, the $Li_3N$ particles may be added to the vessel in inert atmospheric conditions to mitigate $Li_3N$ degradation. In some examples, the metal precursor target (for example, a plate) may include a metal oxide including at least one non-lithium metal, such as one or more of Al, Fe, Cu, W, V, Ti, Ni, Zn, Cd, Ag, and Co.

At 904, the method 900 includes passivating the $Li_3N$ particles via reactive sputtering of the metal precursor target. Specifically, reactive sputtering may occur while the $Li_3N$ particles are continuously blended in the vessel such that a passivation coating including the non-lithium metal may be formed on surfaces of the $Li_3N$ particles.

At 906, the method 900 optionally includes activating the passivation coating on the passivated $Li_3N$ particles. For instance, in certain examples where the non-lithium metal is included in the passivation coating, activation may be realized via application of additional pressure (via mechanical pressing, for example) or ultra-sonication.

Figure 10:
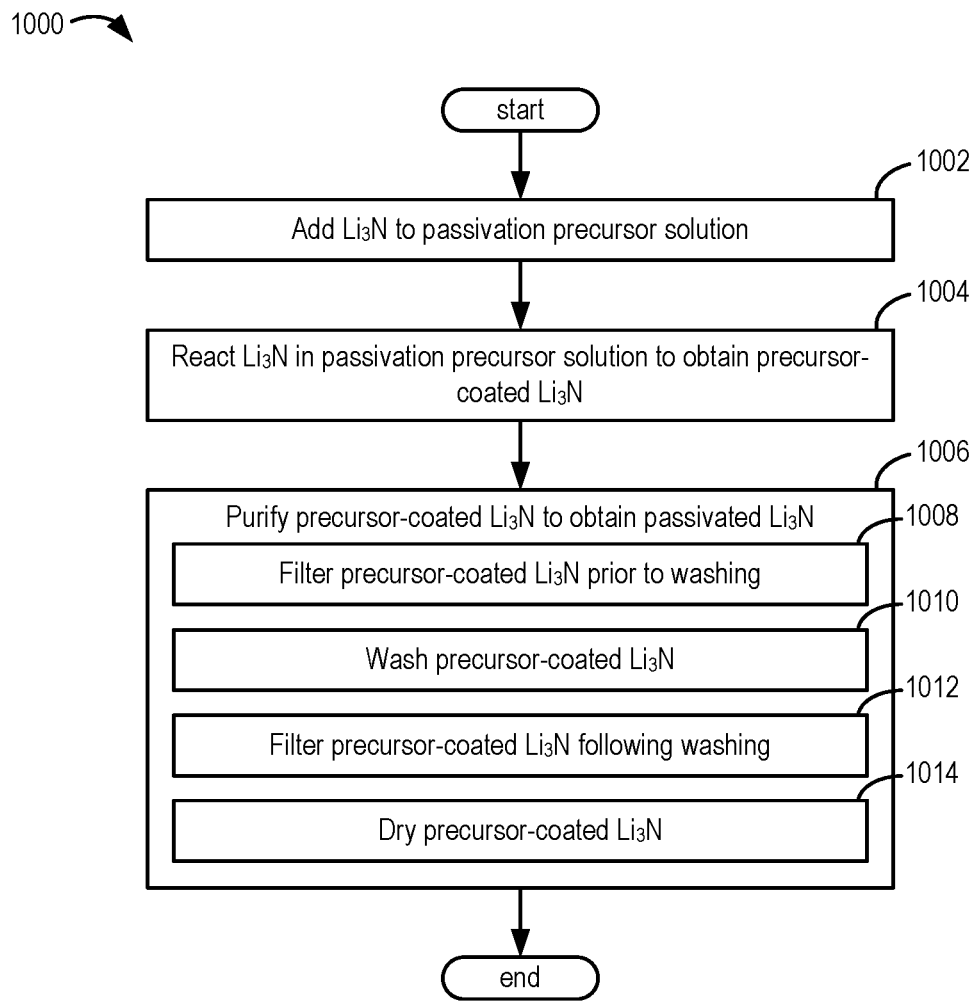
FIG. 10 shows a flow chart of a fifth exemplary method for passivating $Li_3N$ particles, including passivation of the $Li_3N$ particles via wet coating and purifying.

Referring now to FIG. 10, a flow chart of a method 1000 is depicted for passivating $Li_3N$ particles via a first wet coating and purifying process. Accordingly, and as discussed above, the steps of the method 1000 may substitute step 506 of the method 500, as described in detail above with reference to FIG. 5. Further, it will be appreciated that the method 1000 may be described in relation to the components described in detail above with reference to FIGS. 1A-4C. For example, the passivated $Li_3N$ particles may be the pre-lithiation reagent particles 100, 125, 150, or 175 of FIGS. 1A-1D, or the $Li_3N$ particles may be included in coated cathode active material particles, such as the coated cathode active material particles 400, 425, or 450 of FIGS. 4A-4C.

At 1002, the method 1000 includes adding the $Li_3N$ particles to a passivation precursor solution. In some examples, the $Li_3N$ particles may be added to the passivation precursor solution in inert atmospheric conditions to mitigate $Li_3N$ degradation. In some examples, the passivation precursor solution may include an organic material dispersed in a compatible solvent. The organic material may include one or more waxes, one or more long-chain conductive polymers, and/or one or more small organic molecules, such as natural wax, paraffin wax, PE, PP, PS, oleic acid, stearic acid, PVDF-HFP, PEO, PMMA, and/or PMA, for example. Additionally or alternatively, the solvent may include an inert organic solvent, such as hendecane (undecane), dodecane, a mineral oil mixture, linear polysiloxane (s), or a combination thereof.

At 1004, the method 1000 includes reacting the $Li_3N$ particles in the passivation precursor to obtain precursor-coated $Li_3N$ particles. Specifically, surfaces of the $Li_3N$ particles may react with the passivation precursor, such as one or more of $H_2O$, $H_2O_2$, and $H_2S$, to form a passivation layer thereon. In examples wherein a relatively thin passivation layer is desired, a concentration of the passivation precursor in the passivation precursor solution and a reaction temperature may be selected to tune a thickness of the passivation layer. In additional or alternative examples, particles or molecules of the passivation precursor may be attached to the surfaces of the $Li_3N$ particles via surface grafting. In such examples, heat, light (e.g., ultraviolet light), and/or agitation may be supplied to achieve efficient and homogeneous grafting and thereby obtain the precursor-coated $Li_3N$ particles.

At 1006, the method 1000 includes purifying the precursor-coated Li$_3$N particles to obtain passivated Li$_3$N particles. Purification may include removing excess solvent and side products from surfaces of the passivated Li$_3$N particles. Specifically, at 1008, the method 1000 may include filtering the precursor-coated Li$_3$N particles prior to washing at 1010. At 1010, the method 1000 may include washing the precursor-coated Li$_3$N particles. In one example, washing may employ an additional inert organic solvent, such as hexane, to dissolve and carry side products from the surfaces of the passivated Li$_3$N particles. At 1012, the method 1000 may include filtering the precursor-coated Li$_3$N particles following washing at 1010. At 1014, the method 1000 may include drying the precursor-coated Li$_3$N particles. The precursor-coated Li$_3$N particles may be vacuum dried, for example.

Figure 11:
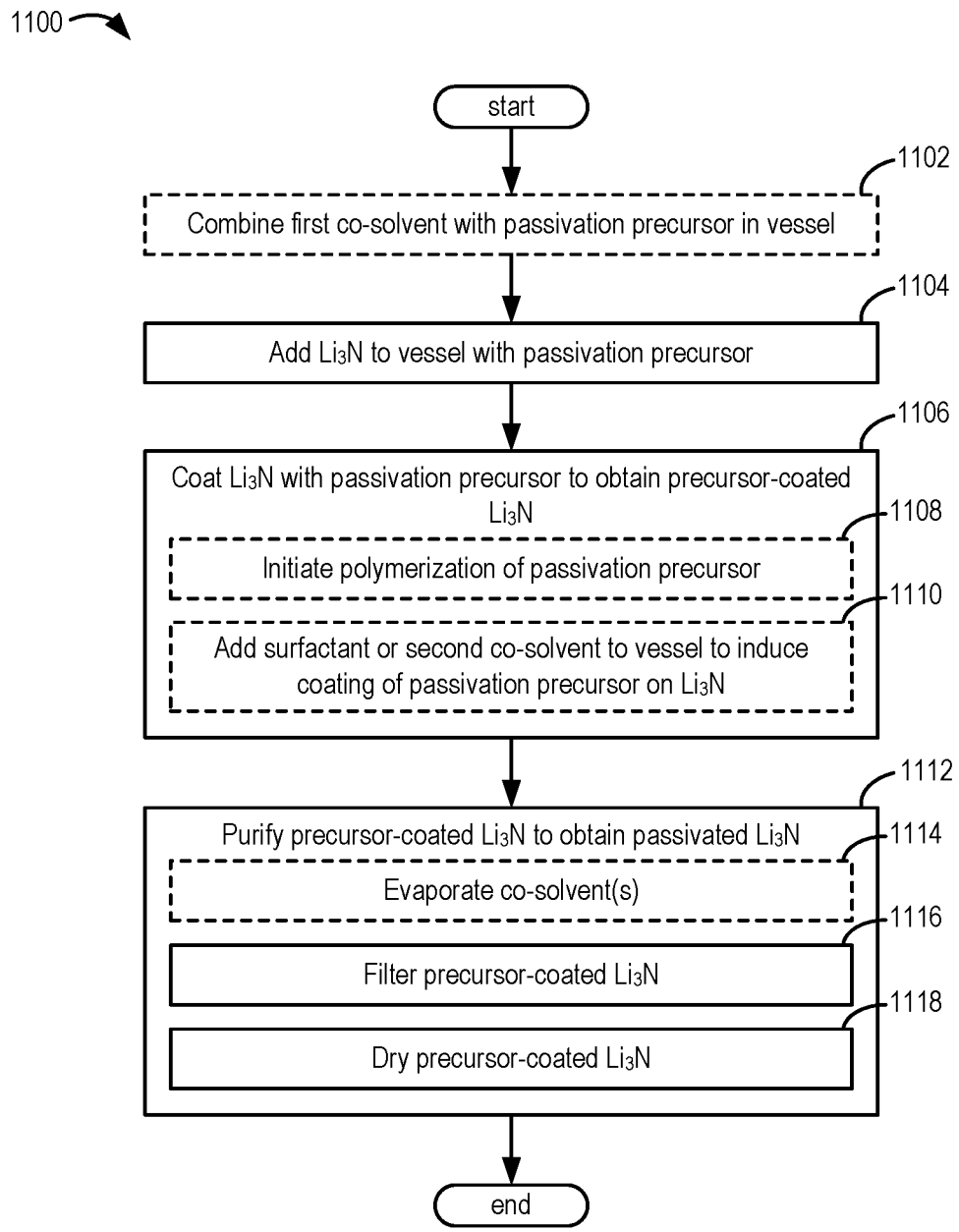
FIG. 11 shows a flow chart of a sixth exemplary method for passivating $Li_3N$ particles, including passivation of the $Li_3N$ particles via wet coating and purifying.

Referring now to FIG. 11, a flow chart of a method 1100 is depicted for passivating Li$_3$N particles via a second wet coating and purifying process. Accordingly, and as discussed above, the steps of the method 1100 may substitute step 506 of the method 500, as described in detail above with reference to FIG. 5. Further, it will be appreciated that the method 1100 may be described in relation to the components described in detail above with reference to FIGS. 1A-4C. For example, the passivated Li$_3$N particles may be the pre-lithiation reagent particles 100, 125, 150, or 175 of FIGS. 1A-1D, or the Li$_3$N particles may be included in coated cathode active material particles, such as the coated cathode active material particles 400, 425, or 450 of FIGS. 4A-4C.

At 1102, the method 1100 optionally includes combining a first co-solvent with a passivation precursor in a vessel. In some examples, the passivation precursor may include one or more PILs. To control for a desired viscosity and concentration of the PILs (and thereby, a uniformity and thickness of a finally-formed passivation coating), a first co-solvent may optionally be added to the vessel in an appropriate amount. In examples wherein the first co-solvent is added to the vessel, a wide array of compositions of the first co-solvent may be contemplated due to a versatility of the PILs. For instance, the first co-solvent may include one or more of an anhydrous alcohol (e.g., one or more of methanol, ethanol, isopropanol, etc.), a carbonate (e.g., one or more of ethylene carbonate, propylene carbonate, etc.), a glycol, chloroform, ethyl acetate, dichloromethane, pyridine, acetone, acetonitrile, and the like. However, selection of the first co-solvent may be limited in some examples based on toxicity or other properties deleterious to human health.

In further examples, the first co-solvent may include water. According, the one or more PILs may be selected to be compatible with water (e.g., PILs including hydrophilic anions, such as Cl$^-$ and I$^-$). However, dispersing hydrophilic PILs in water may disrupt association (e.g., increase dissociation) between anion and cation pairs in solution, potentially impacting an overall coating quality of a finally-formed passivation layer. Specifically, if selection of the concentration and the anion results in the one or more PILs being soluble in water (e.g., to overcome a Hildebrand solubility parameter thereof), increased dissociation between anion and cation pairs in solution may result. As such, the one or more PILs may be selected to be incompatible with water (e.g., PILs including hydrophobic anions, such as PF$_6^-$). In other examples, the first co-solvent may be non-aqueous.

At 1104, the method 1100 includes adding the Li$_3$N particles to the vessel with the passivation precursor. In some examples, the Li$_3$N particles may be added to the vessel in inert atmospheric conditions to mitigate Li$_3$N degradation. With 1102 being optional, the first co-solvent may or may not be present upon addition of the Li$_3$N particles to the vessel.

At 1106, the method 1100 includes coating the Li$_3$N particles with the passivation precursor to obtain precursor-coated Li$_3$N particles. In some examples, coating may be accomplished by submerging the Li$_3$N particles in a pure (undiluted) PIL (as the passivation precursor) and agitating the vessel. In one example, the passivation precursor may be the one or more PILs or one or more ionomers, which may be locally melted with shear from physical mixing. In such examples, the passivation precursor may form a passivation coating on the Li$_3$N particles alone, or on larger structures, such as Li$_3$N-coated cathode active material particles (which may include exposed Li$_3$N).

In certain examples where the passivation precursor includes the one or more PILs, coating of the Li$_3$N particles may be configured to cross-link and/or polymerize the one or more PILs thereon. As an example, at 1108, the method 1100 may optionally include initiating polymerization of the passivation precursor. For example, the passivation precursor may include the one or more PILs, which may be (further) polymerized via addition of a free radical initiator and heating, or ultraviolet-based (UV) treatment. However, in other examples, polymerization initiation may not be employed, as the one or more PILs may be polymerized prior to addition to the vessel. As another example, at 1110, the method 1100 may optionally include adding a surfactant or a second co-solvent to the vessel to induce coating of the passivation precursor on surfaces of the Li$_3$N particles, the second co-solvent being of opposite polarity to the first co-solvent. As such, in examples where the passivation precursor includes the one or more PILs, the surfactant or the second co-solvent may coagulate the one or more PILs onto the surfaces of the Li$_3$N particles (driven by differences in miscibilities of the surfactant and the first co-solvent or the first and second co-solvents, for example).

At 1112, method 1100 includes purifying the precursor-coated Li$_3$N particles to obtain passivated Li$_3$N particles. Specifically, at 1114, the method 1100 may optionally include evaporating the first and/or second co-solvents (if present). At 1116, the method 1100 may include filtering the precursor-coated Li$_3$N particles. At 1118, the method 1100 may include drying the precursor-coated Li$_3$N particles.

Once passivated Li$_3$N particles may be incorporated into a cathode structure, such as cathode structure 300 or 350 of FIG. 3A-B. The cathode structures may be further combined with other components as detailed in FIG. 12 below to form a Li-ion battery cell. Further, multiple Li-ion battery cells may be combined to form a Li-ion battery pack. A schematic diagram 1200 depicting a battery pack 1202 is shown in FIG. 12. In some examples, the battery pack 1202 may be included in the battery pack assembly wherein a plurality of lithium-ion battery cells 1204 may be removably affixed to the enclosure base 1212. Accordingly, it will be appreciated that each lithium-ion battery cell 1204 may represent a fundamental unit from which a battery pack of arbitrary size, arbitrary power, and having an arbitrary number of lithium-ion battery cells 1204 may be constructed. It will further be appreciated that other embodiments not depicted at FIG. 12 may include a battery pack having only one lithium-ion battery cell.

Further, each of the plurality of lithium-ion battery cells 1204 may expose a positive electrode tab 1206 and a negative electrode tab 1208, which may be configured to couple to the positive electrode and the negative electrode, respectively. The positive electrode may be a cathode in which $Li_3N$ passivated particles are incorporated such as cathode structures 300 or 350 of FIG. 3A-B.

The plurality of lithium-ion battery cells 1204 may be retained in the stacked configuration by bands 1210. As shown, one or more bands 1210 may circumscribe the plurality of lithium-ion battery cells 1204 so as to prevent displacement of individual lithium-ion battery cells 1204 relative to one another.

In this way, passivated $Li_3N$ particles are provided as sacrificial pre-lithiation reagents to improve initial cycling performance in lithium-ion batteries. In some examples, a passivation coating process of the $Li_3N$ particles may be conducted under precise environmental conditions such that thin, uniform, and reproducible passivation coatings may be formed. For instance, the passivation coating may be thin enough so as not to inhibit $Li_3N$-driven pre-lithiation of the lithium-ion battery while providing sufficient coverage of surfaces of the $Li_3N$ particles to prevent undesired side reactions. Significant experimentation may accordingly be employed to carefully adjust parameters of the passivation coating process such that maximal pre-lithiation may be consistently provided to the lithium-ion battery during initial charging, thereby improving an overall electrochemical performance thereof.

Further, a composition of the passivation coating may be selected to improve electronic conductivity, ionic conductivity, cycling performance, electrode active material stability, and/or provide further sacrificial $Li^+$ ions. Additionally or alternatively, the composition of the passivation coating may be selected to rapidly decompose/dissolve in a battery environment, concomitantly increasing a rate of pre-lithiation at exposed $Li_3N$ surfaces. Correspondingly, the passivation coating process may be further tailored to considerations specific to the selected composition, such that sufficient protection of the $Li_3N$ particles may be maintained while further improving the overall electrochemical performance of the lithium-ion battery.

In one example, a cathode pre-lithiation reagent comprises a core particle comprising $Li_3N$, and a passivation coating uniformly disposed on at least a portion of a surface of the core particle. A first example of the cathode pre-lithiation reagent further includes wherein the passivation coating has a thickness of 20 nm or less. A second example of the cathode pre-lithiation reagent, optionally including the first example of the cathode pre-lithiation reagent, further includes wherein the passivation coating is uniformly disposed on substantially 100% of the surface of the core particle. A third example of the cathode pre-lithiation reagent, optionally including one or more of the first and second examples of the cathode pre-lithiation reagent, further includes wherein the passivation coating is formed as a continuous layer on the surface of the core particle. A fourth example of the cathode pre-lithiation reagent, optionally including one or more of the first through third examples of the cathode pre-lithiation reagent, further includes wherein the passivation coating is formed as a discrete coating of passivating particulates physically or chemically bound to the surface of the core particle. A fifth example of the cathode pre-lithiation reagent, optionally including one or more of the first through fourth examples of the cathode pre-lithiation reagent, further includes wherein the passivation coating comprises one or more of $Li_2O_2$, $Li_2O$, $Li_2CO_3$, $Li_2S$, and LiF. A sixth example of the cathode pre-lithiation reagent, optionally including one or more of the first through fifth examples of the cathode pre-lithiation reagent, further includes wherein the passivation coating comprises one or more of carbon black, graphene, graphene oxide, and carbon nanotubes. A seventh example of the cathode pre-lithiation reagent, optionally including one or more of the first through sixth examples of the cathode pre-lithiation reagent, further includes wherein the passivation coating comprises one or more organic materials. An eighth example of the cathode pre-lithiation reagent, optionally including one or more of the first through seventh examples of the cathode pre-lithiation reagent, further includes wherein the passivation coating comprises one or more ionomers and/or polymerization ionic liquids. A ninth example of the cathode pre-lithiation reagent, optionally including one or more of the first through eighth examples of the cathode pre-lithiation reagent, further includes wherein the passivation coating comprises one or more non-lithium metals or metal oxides including oxides of Al, Fe, Cu, W, V, Ti, Ni, Zn, Cd, Ag, and/or Co.

In another example, a lithium-ion battery comprises a cathode, comprising a lithiated cathode active material, a primary sacrificial pre-lithiation reagent composed of pure $Li_3N$ particles, and a passivation coating uniformly disposed on surfaces of the primary sacrificial pre-lithiation reagent, a lithiated anode, and an electrolyte, the cathode and the lithiated anode immersed in the electrolyte, wherein the passivation coating segregates the primary sacrificial pre-lithiation reagent from the electrolyte. A first example of the lithium-ion battery further includes wherein the primary sacrificial pre-lithiation reagent decomposes to provide lithium ions during pre-lithiation of the lithium-ion battery, and wherein no cathode catalyst is present in the lithium-ion battery prior to initial cycling of the lithium-ion battery. A second example of the lithium-ion battery, optionally including the first example of the lithium-ion battery, further includes wherein the passivation coating comprises a secondary sacrificial pre-lithiation reagent, wherein the secondary sacrificial pre-lithiation reagent comprises one or more lithium-containing compounds, and wherein each of the primary and secondary sacrificial pre-lithiation reagents decomposes to provide lithium ions during pre-lithiation of the lithium-ion battery. A third example of the lithium-ion battery, optionally including one or more of the first and second examples of the lithium-ion battery, further includes wherein the passivation coating further comprises a cathode catalyst, the cathode catalyst catalyzing decomposition of the secondary sacrificial pre-lithiation reagent during the pre-lithiation of the lithium-ion battery. A fourth example of the lithium-ion battery, optionally including one or more of the first through third examples of the lithium-ion battery, further includes wherein the passivation coating comprises a carbonaceous conductive additive. A fifth example of the lithium-ion battery, optionally including one or more of the first through fourth examples of the lithium-ion battery, further includes wherein the passivation coating comprises one or more organic materials, each of the one or more organic materials soluble in the electrolyte. A sixth example of the lithium-ion battery, optionally including one or more of the first through fifth examples of the lithium-ion battery, further includes wherein the passivation coating comprises one or more polymeric salts. A seventh example of the lithium-ion battery, optionally including one or more of the first through sixth examples of the lithium-ion battery, further includes wherein the passivation coating comprises one or more non-lithium metals or metal oxides. An eighth example of the lithium-ion battery, optionally including one or more of the first through seventh examples of the lithium-ion battery, further includes wherein the passivation coating has a thickness of less than or equal to 20 nm. A ninth example of the lithium-ion battery, optionally including one or more of the first through eighth examples of the lithium-ion battery, further includes wherein the lithiated cathode active material is in particulate form, and wherein the lithiated cathode active material is coated with the primary sacrificial pre-lithiation reagent.

In yet another example, a method comprises passivating Li$_3$N particles to form a uniform passivation coating thereon, and forming a cathode slurry comprising the passivated Li$_3$N particles. A first example of the method further includes wherein the Li$_3$N particles have a normal particle size distribution with a peak at or below 150 nm. A second example of the method, optionally including the first example of the method, further includes wherein the Li$_3$N particles have a D50 size of 150 nm or less. A third example of the method, optionally including one or more of the first and second examples of the method, further includes wherein the uniform passivation coating has a thickness ranging from 1 nm to 50 nm. A fourth example of the method, optionally including one or more of the first through third examples of the method, further comprises coating a cathode active material with the Li$_3$N particles prior to or following passivation. A fifth example of the method, optionally including one or more of the first through fourth examples of the method, further includes wherein passivating the Li$_3$N particles comprises: enclosing the Li$_3$N particles in a vessel having a controlled passivating atmosphere; and coating the Li$_3$N particles via reaction with the controlled passivating atmosphere. A sixth example of the method, optionally including one or more of the first through fifth examples of the method, further includes wherein passivating the Li$_3$N particles further comprises chemically treating the coated Li$_3$N particles. A seventh example of the method, optionally including one or more of the first through sixth examples of the method, further includes wherein passivating the Li$_3$N particles comprises coating the Li$_3$N particles with a passivating precursor via mechanical blending. An eighth example of the method, optionally including one or more of the first through seventh examples of the method, further includes wherein coating the Li$_3$N particles further comprises homogeneously mixing a cathode catalyst with the passivating precursor prior to mechanically blending the Li$_3$N particles with the passivating precursor. A ninth example of the method, optionally including one or more of the first through eighth examples of the method, further includes wherein passivating the Li$_3$N particles comprises: coating the Li$_3$N particles with a passivation precursor; and firing the coated Li$_3$N particles. A tenth example of the method, optionally including one or more of the first through ninth examples of the method, further includes wherein passivating the Li$_3$N particles comprises coating the Li$_3$N particles via reactive sputtering of a metal precursor target. An eleventh example of the method, optionally including one or more of the first through tenth examples of the method, further includes wherein passivating the Li$_3$N particles further comprises activating the coated Li$_3$N particles. A twelfth example of the method, optionally including one or more of the first through eleventh examples of the method, further includes wherein passivating the Li$_3$N particles comprises: coating the Li$_3$N particles with a passivation precursor; and purifying the coated Li$_3$N particles. A thirteenth example of the method, optionally including one or more of the first through twelfth examples of the method, further includes wherein passivating the Li$_3$N particles further comprises adding a first co-solvent prior to coating the Li$_3$N particles with the passivation precursor. A fourteenth example of the method, optionally including one or more of the first through thirteenth examples of the method, further includes wherein coating the Li$_3$N particles with the passivation precursor comprises adding a surfactant or a second co-solvent to induce coating of the passivation precursor on surfaces of the Li$_3$N particles, the second co-solvent having opposite polarity to the first co-solvent. A fifteenth example of the method of the method, optionally including one or more of the first through fourteenth examples of the method, further includes wherein coating the Li$_3$N particles with the passivation precursor comprises initiating polymerization of the passivation precursor. A sixteenth example of the method, optionally including one or more of the first through fifteenth examples of the method, further comprises forming a layered cathode comprising a cathode structure with the cathode slurry coated thereon.

In yet another example, a layered cathode, comprising a current collector, and one or more slurry-coated layers disposed on opposite sides of the current collector, at least one of the one or more slurry-coated layers comprising uniformly and completely passivated lithium nitride particles. A first example of the layered cathode further includes wherein the uniformly and completely passivated lithium nitride particles comprise: a plurality of lithium nitride particles having an average size of less than or equal to 150 nm; and a passivation coating uniformly and completely covering each of the plurality of lithium nitride particles. A second example of the layered cathode, optionally including the first example of the layered cathode, further includes wherein the passivation coating has a thickness of less than or equal to 20 nm.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cathode pre-lithiation reagent, comprising:
 a core particle comprising Li$_3$N, wherein a D50 of the core particle is 150 nm or less; and
 a passivation coating uniformly disposed on at least a portion of a surface of the core particle, wherein the passivation coating is formed as a discrete coating of passivating particulates physically or chemically bound to the surface of the core particle, and wherein a size of the passivating particulates is less than or equal to 50 nm and corresponds to a maximum thickness of the passivation coating.

2. The cathode pre-lithiation reagent of claim 1, wherein the passivation coating has a thickness of 20 nm or less and greater than or equal to 10 nm.

3. The cathode pre-lithiation reagent of claim 1, wherein the passivation coating is uniformly disposed on substantially 100% of the surface of the core particle.

4. The cathode pre-lithiation reagent of claim 1, wherein the passivation coating is formed as a continuous layer on the surface of the core particle.

5. The cathode pre-lithiation reagent of claim 1, wherein the passivation coating comprises one or more of $Li_2O_2$, $Li_2O$, $Li_2CO_3$, $Li_2S$, and LiF.

6. The cathode pre-lithiation reagent of claim 1, wherein the passivation coating comprises one or more of carbon black, graphene, graphene oxide, and carbon nanotubes.

7. The cathode pre-lithiation reagent of claim 1, wherein the passivation coating comprises one or more of poly(ethylene) oxide, poly(methyl methactrylate), and poly(methyl acrylate).

8. The cathode pre-lithiation reagent of claim 1, wherein the passivation coating comprises one or more ionomers and/or polymerization ionic liquids.

9. The cathode pre-lithiation reagent of claim 1, wherein the passivation coating comprises one or more metal oxides including oxides of Al, Fe, Cu, W, V, Ti, Ni, Zn, Cd, Ag, and/or Co.

10. A lithium-ion battery, comprising:
   a cathode, comprising:
      a lithiated cathode active material core particle, wherein a D50 of the lithiated cathode active material core particle is ≥5 μm and ≤15 μm;
      a primary sacrificial pre-lithiation reagent composed of pure $Li_3N$ particles, wherein a D50 of the $Li_3N$ particles is 150 nm or less, and wherein the lithiated cathode active material core particle is surrounded by the $Li_3N$ particles; and
      a passivation coating uniformly disposed on surfaces of the primary sacrificial pre-lithiation reagent;
   a lithiated anode; and
   an electrolyte, the cathode and the lithiated anode immersed in the electrolyte,
   wherein the passivation coating segregates the primary sacrificial pre-lithiation reagent from the electrolyte.

11. The lithium-ion battery of claim 10, wherein the primary sacrificial pre-lithiation reagent decomposes to provide lithium ions during pre-lithiation of the lithium-ion battery, and
   wherein no cathode catalyst is present in the lithium-ion battery prior to initial cycling of the lithium-ion battery.

12. The lithium-ion battery of claim 10, wherein the passivation coating comprises a secondary sacrificial pre-lithiation reagent and a catalyst,
   wherein the secondary sacrificial pre-lithiation reagent comprises one or more of $Li_2O_2$, $Li_2O$, $Li_2CO_3$, $Li_2S$, and LiF and the catalyst comprises cobalt tetraoxide, and
   wherein each of the primary and secondary sacrificial pre-lithiation reagents decomposes to provide lithium ions during pre-lithiation of the lithium-ion battery.

13. A cathode pre-lithiation reagent, comprising:
   a core particle comprising $Li_3N$; and
   a passivation coating uniformly disposed on at least a portion of a surface of the core particle, wherein the passivation coating comprises one or more metal oxides including oxides of Al, Fe, Cu, W, V, Ti, Ni, Zn, Cd, Ag, and/or Co, and wherein the cathode pre-lithiation reagent is adhered to a surface of a cathode active material particle.

* * * * *